(12) United States Patent
Carvalho

(10) Patent No.: US 10,869,210 B2
(45) Date of Patent: Dec. 15, 2020

(54) OFDM SIGNAL PARAMETER ESTIMATION

(71) Applicant: Imagination Technologies Limited, Kings Langley (GB)

(72) Inventor: Filipe Wiener Carvalho, Monmouthshire (GB)

(73) Assignee: Imagination Technologies Limited, Kings Langley (GB)

( * ) Notice: Subject to any disclaimer, the term of this patent is extended or adjusted under 35 U.S.C. 154(b) by 242 days.

(21) Appl. No.: 15/907,542

(22) Filed: Feb. 28, 2018

(65) Prior Publication Data

US 2018/0249356 A1 Aug. 30, 2018

(30) Foreign Application Priority Data

Feb. 28, 2017 (GB) .................................. 1703249.1

(51) Int. Cl.
*H04L 27/26* (2006.01)
*H04W 24/08* (2009.01)
*H04L 5/00* (2006.01)

(52) U.S. Cl.
CPC ........... *H04W 24/08* (2013.01); *H04L 5/0007* (2013.01); *H04L 27/2666* (2013.01)

(58) Field of Classification Search
CPC ......... H04W 24/08; H04L 5/00; H04L 5/0007
See application file for complete search history.

(56) References Cited

U.S. PATENT DOCUMENTS

| | | | |
|---|---|---|---|
| 2005/0147186 A1* | 7/2005 | Funamoto | H04L 27/2605 375/324 |
| 2005/0226350 A1* | 10/2005 | Goto | H04L 27/2662 375/317 |
| 2007/0104297 A1* | 5/2007 | Gorday | H04B 1/707 375/343 |
| 2008/0043886 A1* | 2/2008 | Inagawa | H04B 1/7183 375/343 |
| 2008/0152048 A1 | 6/2008 | Adachi | |
| 2010/0303175 A1* | 12/2010 | Pirot | H04L 25/0212 375/340 |
| 2014/0269981 A1* | 9/2014 | Asjadi | H04L 27/2601 375/295 |
| 2015/0172038 A1* | 6/2015 | Jiang | H04L 5/143 370/280 |
| 2015/0381468 A1 | 12/2015 | Murphy | |

(Continued)

FOREIGN PATENT DOCUMENTS

EP 2518962 A1 10/2012
JP 2006203291 A 8/2006

(Continued)

*Primary Examiner* — Chi Ho A Lee
(74) *Attorney, Agent, or Firm* — Potomac Law Group, PLLC; Vincent M DeLuca

(57) ABSTRACT

A combination of signal parameters of a received OFDM signal are determined by determining, for each of a plurality of lags, a plurality of correlation peaks for the OFDM signal, wherein the correlation peaks form a plurality of sets of peaks, wherein each set of peaks is associated with a combination of signal parameters of the OFDM signal; performing a validation procedure to validate one or more peaks based on at least one correlation peak value; and determining a combination of signal parameters of the OFDM signal based on the validated peaks in the sets of peaks.

20 Claims, 9 Drawing Sheets

(56) References Cited

U.S. PATENT DOCUMENTS

| | | | |
|---|---|---|---|
| 2016/0066017 A1 | 3/2016 | Kobayashi et al. | |
| 2016/0226696 A1* | 8/2016 | Zhang | H04L 27/2663 |
| 2016/0241425 A1* | 8/2016 | Xin | H04L 1/0091 |
| 2017/0078131 A1* | 3/2017 | Kessel | H04L 27/2649 |
| 2018/0102840 A1* | 4/2018 | Jiang | H04L 5/0048 |
| 2019/0349021 A1* | 11/2019 | Li | H04B 1/70755 |

FOREIGN PATENT DOCUMENTS

| | | |
|---|---|---|
| JP | 2008085690 A | 4/2008 |
| JP | 2010278827 A | 12/2010 |

\* cited by examiner

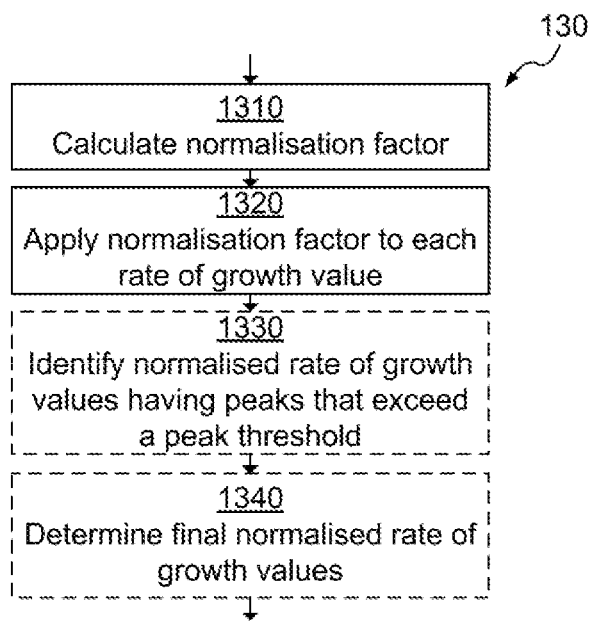
FIGURE 4
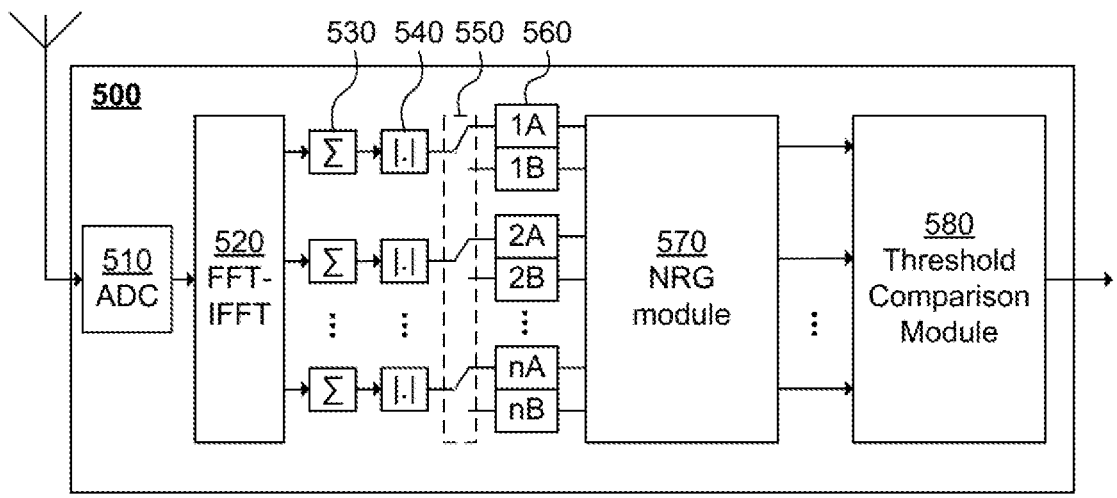
FIGURE 5
| | Abs. Value 1 | Abs. Value 2 | Abs. Value 3 | Abs. Value 4 | Abs. Value 5 | Abs. Value 6 | Abs. Value 7 | Abs. Value 8 |
|---|---|---|---|---|---|---|---|---|
| 610 | | | | | | | | |
| 620 | 1B | Discard | 1A | 1B | Discard | 1A | 1B | Discard |
| 630 | 1B | Discard | Discard | 1A | 1B | Discard | Discard | 1A |
| 640 | 1B | Discard | Discard | Discard | 1A | 1B | Discard | Discard |
| 650 | 1B | Discard | Discard | Discard | Discard | 1A | 1B | Discard |
| 660 | 1B | Discard | Discard | Discard | Discard | Discard | 1A | 1B |
FIGURE 6(a)

| | Abs. Value 1 | Abs. Value 2 | Abs. Value 3 | Abs. Value 4 | Abs. Value 5 | Abs. Value 6 | Abs. Value 7 | Abs. Value 8 | Abs. Value 9 |
|---|---|---|---|---|---|---|---|---|---|
| 610 | | | | | | | | | |
| 620 | 1A | 1A | 1A | 1B | 1B | 1B | 1A | 1A | 1A |
| 630 | 1A | 1A | 1A | 1A | 1B | 1B | 1B | 1B | 1A |
| 640 | 1A | 1A | 1A | 1A | 1A | 1B | 1B | 1B | 1B |
FIGURE 6(b)
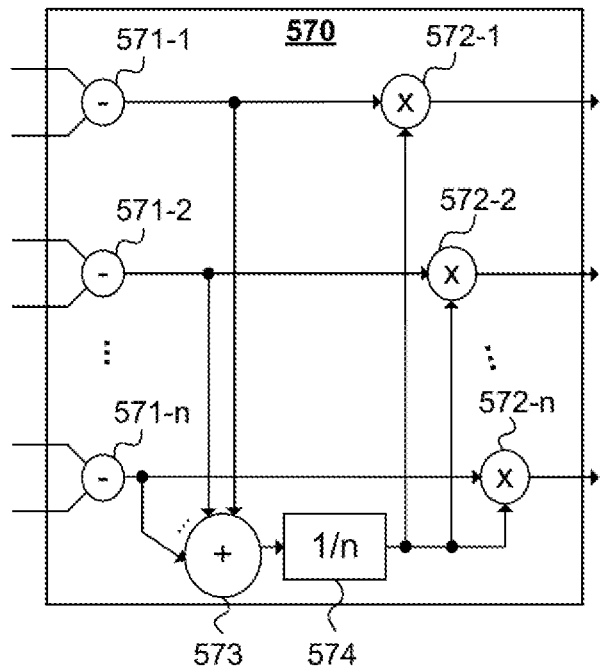
FIGURE 7
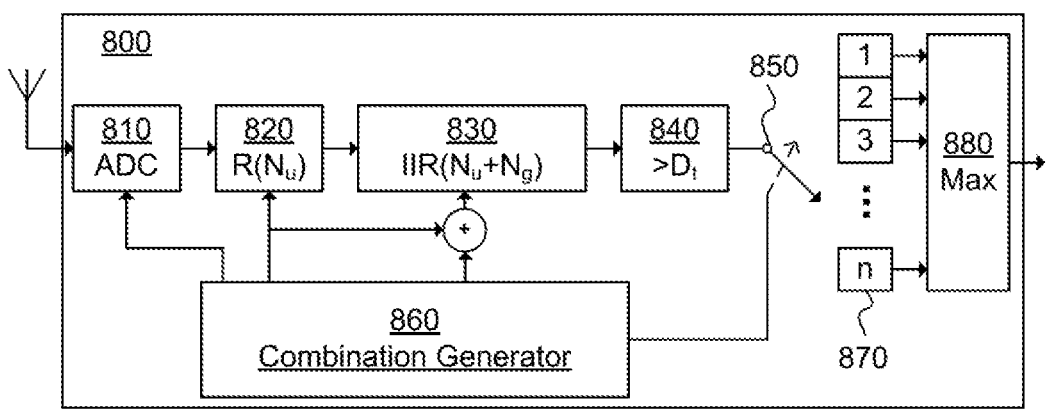
FIGURE 8

|         | 1/3 peak | 2/3 peak | 3/3 peak |
|---------|----------|----------|----------|
| 5 MHz; 2K | ✓ | ✓ | ✓ |
| 5 MHz; 4K | ✓ | ✗ | ✗ |
| ... | ... | ... | ... |
| 8 MHz; 8K | ✗ | ✓ | ✓ |

FIG. 13(a)

|         | 1/3 peak | 2/3 peak | 3/3 peak |
|---------|----------|----------|----------|
| 5 MHz; 2K | ✓ | ✓ | ✓ |
| 5 MHz; 4K | ✗ | ✗ | ✗ |
| ... | ... | ... | ... |
| 8 MHz; 8K | ✗ | ✓ | ✓ |

FIG. 13(b)

|         | 1/3 peak | 2/3 peak | 3/3 peak |
|---------|----------|----------|----------|
| 5 MHz; 2K | ✓ | ✓ | ✓ |
| ... | ... | ... | ... |
| 8 MHz; 8K | ✗ | ✓ | ✓ |

FIG. 13(c)

|         | 1/3 peak | 2/3 peak | 3/3 peak |
|---------|----------|----------|----------|
| 5 MHz; 2K | ✓ | ✓ | ✓ |
| ... | ... | ... | ... |
| 8 MHz; 8K | ✗ | ✗ | ✓ |

FIG. 13(d)

|         | 1/3 peak | 2/3 peak | 3/3 peak |
|---------|----------|----------|----------|
| 5 MHz; 2K | ✓ | ✓ | ✓ |
| ... | ... | ... | ... |
| 8 MHz; 8K | ✗ |  |  |

FIG. 13(e)

OFDM SIGNAL PARAMETER ESTIMATION

BACKGROUND

In many communication systems, it can be desirable for a receiver to identify whether a particular signal is present at the receiver and/or the parameters of that signal. This detection of the presence or absence of a signal or the parameters of the signal, allows the receiver to determine whether or not further processing of a received signal should be initiated. It is desirable to quickly detect the presence or absence of a signal and/or its parameters to reduce the latency of a receiver and to improve power saving.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of determining a combination of signal parameters of a received OFDM signal, the method comprising: determining, for each of a plurality of lags, a plurality of correlation peaks for the OFDM signal, wherein the correlation peaks form a plurality of sets of peaks, wherein each set of peaks is associated with a combination of signal parameters of the OFDM signal; performing a validation procedure to validate one or more peaks based on at least one correlation peak value; and determining a combination of signal parameters of the OFDM signal based on the validated peaks in the sets of peaks.

There is provided an OFDM signal parameter estimator configured to determine a combination of signal parameters of a received OFDM signal, the estimator configured to: determine, for each of a plurality of lags, a plurality of correlation peaks for the OFDM signal, wherein the correlation peaks form a plurality of sets of peaks, wherein each set of peaks is associated with a combination of signal parameters of the OFDM signal; perform, using a peak validation module, a validation procedure to validate one or more peaks based on at least one correlation peak value; and determine a combination of signal parameters of the OFDM signal based on the validated peaks in the sets of peaks.

The OFDM signal parameter estimator may be embodied in hardware on an integrated circuit. There may be provided a method of manufacturing, at an integrated circuit manufacturing system, an OFDM signal parameter estimator. There may be provided an integrated circuit definition dataset that, when processed in an integrated circuit manufacturing system, configures the system to manufacture an OFDM signal parameter estimator. There may be provided a non-transitory computer readable storage medium having stored thereon a computer readable description of an integrated circuit that, when processed, causes a layout processing system to generate a circuit layout description used in an integrated circuit manufacturing system to manufacture an OFDM signal parameter estimator.

There may be provided an integrated circuit manufacturing system comprising: a non-transitory computer readable storage medium having stored thereon a computer readable integrated circuit description that describes the OFDM signal parameter estimator; a layout processing system configured to process the integrated circuit description so as to generate a circuit layout description of an integrated circuit embodying the OFDM signal parameter estimator; and an integrated circuit generation system configured to manufacture the OFDM signal parameter estimator according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 4 illustrates an example method for normalising determined rate of growth values;

FIG. 5 illustrates an example OFDM signal detector according to the present disclosure;

FIGS. 6($a$) and 6($b$) illustrate examples of switching schemes to implement grouping of absolute accumulated values in an example OFDM signal detector;

FIG. 7 illustrates an example structure of a normalised rate of growth module illustrated in FIG. 5;

FIG. 8 illustrates an example OFDM parameter estimator for determining signal parameters of an OFDM signal;

FIG. 10($b$) illustrates an example method of performing a validation procedure on each peak in the sets of peaks according to the present disclosure;

FIG. 12($b$) illustrates an example first set of peaks according to the present disclosure;

FIG. 12($c$) illustrates an example second set of peaks according to the present disclosure;

FIG. 12($d$) illustrates an example third set of peaks according to the present disclosure;

FIGS. 13($a$) to ($e$) illustrate an example approach to invalidating peaks;

Figure 1:
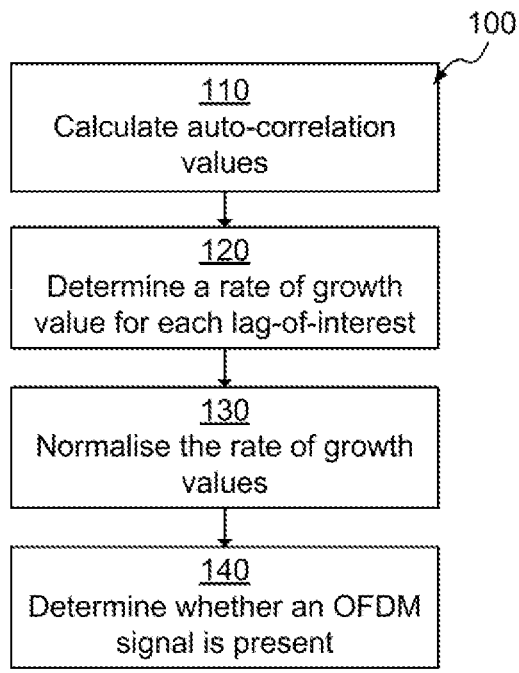
FIG. 1 illustrates an example method of detecting the presence of an OFDM signal in a received input signal according to the present disclosure.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

An orthogonal frequency division multiplexing (OFDM) receiver is a receiver configured to decode received input signals that were encoded using OFDM techniques. In many applications, it is desirable for an OFDM receiver to detect the presence of an OFDM signal in a received signal. It may be possible to detect at an OFDM receiver the presence of an OFDM signal without making a determination as to specific signal parameters of the received OFDM signal (such as guard interval, bandwidth mode, and FFT size). Instead, determining the presence of an OFDM signal may involve determining whether or not an OFDM signal has been received.

The OFDM signal may be a DVB signal, such as a DVB-T signal, an ISDB-T signal, or a DVB-T2 signal. The OFDM signal may be an IEEE 802.11 signal, such as an 802.11a signal, an 802.11g signal, an 802.11n signal, and/or an 802.11ac signal. The OFDM signal may be a WiMAX signal, an LTE signal, or may be any other signal that was encoded using OFDM. The OFDM receiver may be a receiver for receiving the specific type of OFDM signal. For example, where the OFDM signal is a DVB signal, the OFDM receiver may be a DVB receiver. The OFDM receiver may be configured to report empty channels significantly sooner or begin more intensive signal processing operations on the received signal upon a determination that an OFDM signal is absent or present, respectively. In this way, it is possible to save power and time in a receiver by checking for the presence of an OFDM signal.

The approaches set out herein provide an improved approach for detecting the presence of an OFDM signal in which the time taken to detect the presence of an OFDM signal is reduced compared to known techniques. Specifically, the approaches set out herein can perform a correlation operation and perform rate of growth or peak calculations at pre-determined lags of interest to quickly and simply arrive at a presence determination and/or signal parameter estimation.

FIG. 1 illustrates an example method 100 for detecting the presence (and/or absence) of an OFDM signal in a received input signal which may be performed at an OFDM receiver, according to the present disclosure.

The method 100 begins after a data signal has been received and sampled. The method may therefore include additional steps of receiving an input signal and sampling the input signal to generate one or more blocks of data samples, where the blocks comprise a pre-determined number of consecutively captured samples. The input to the method is therefore a plurality of blocks of data samples consecutively sampled from the input signal. The input signal received may or may not include an OFDM data signal and the purpose of method 100 is to identify whether or not the received signal includes an OFDM signal. Each block of data samples may be of the same length (in terms of the number of samples). For example, where the OFDM signal is a DVB signal the OFDM receiver is a DVB receiver, the DVB receiver may be configured such that each block of data samples is 32,768 samples in length. The length of the data sample blocks may depend for example on the maximum OFDM symbol duration expected at a receiver, i.e. the longest OFDM symbol that is expected to be received.

At step 110 of the example method of FIG. 1, auto-correlation values may be determined for each block of samples at each of a number of lags of interest (hereinafter LOI) to generate an auto-correlation value for each LOI. Example auto-correlation values calculated for an example input signal can be seen in FIG. 2($a$) wherein the OFDM signal is a DVB-T signal. In the FIG. 3($a$), 21 different blocks of data samples are processed with each block of data samples comprising 32,768 data samples for 12 different LOI. As can be seen in FIG. 3($a$), some LOI have significantly larger auto-correlation values than others. Depending upon the number of auto-correlation operations performed, the correlation may be performed in the time-domain or the frequency-domain. For example, where M correlations with a lag of up to ±N/2, the correlation operations may be performed in the time-domain if $\log_2(N) > M$. Conversely, if $\log_2(N) < M$, then the correlation operations may be performed in the frequency domain. For example, where N=32, 768, for LOI up to 15 and lags up to 16K, the correlations may be performed in the time domain.

In some arrangements, the auto-correlation values calculated at step 110 may be calculated by performing an inverse Fourier transform of the absolute value of the Fourier transform of the input signal. In this way, all of the auto-correlation results for a particular block of data samples can be generated in one calculation, since the calculation is performed in the frequency-domain. Computation efficiency and latency in the determination of the absence or presence of a signal can therefore be increased and reduced, respectively, where there are a large number of LOI to be considered. In other implementations, it may be more efficient to perform the calculation in the time-domain. For example, where there are fewer than $\log_2(\text{NFFT})$ LOI to consider, time-domain based correlation calculations may be a suitably efficient approach. The auto-correlation results for a particular block of data samples may be generated in one calculation and may be output in parallel. Once the processing of a first block of data samples is complete, the next block of data samples may be processed and the auto-correlation results from the first block may be operated upon.

Having generated the auto-correlation values for a number of blocks at step 110, the detection method proceeds to step 120. At step 120, a rate of growth value is determined for each of the plurality of LOI and is determined across a plurality of blocks of samples based on the auto-correlation values calculated for those blocks of samples. A "rate of growth" value can be considered to be a value that represents a measure of the rate at which the accumulated correlation result of a signal for a LOI increases over time. The determination can therefore be considered as a form of rolling average measurement which indicates the rate at which the accumulated auto-correlation values are increasing across a number of blocks of data, such as across portions or groups of input data blocks. For example, accumulated auto-correlation values may be determined over a fixed window in time (i.e. across a pre-determined number of blocks of samples) that forms a group of blocks of samples. Each rate of growth value is associated with a corresponding LOI and may be a measure of the rate at which the accumulated correlation of the signal increased over that fixed window in time. The rate of growth provides a measure as to the likelihood that a signal was present in the input signal throughout that fixed window in time. A high rate of growth indicates that the signal is present throughout that window in time. A low rate of growth indicates that the signal was likely not present throughout that window in time. Furthermore, a negative rate of growth indicates that the correlation for that specific lag is inconsistent, which may indicate the presence of noise. Since the rate of growth value is determined over a number of blocks of data samples in a period of time, the rate of growth value is resilient to fluctuations in correlation caused by echoes, interference, or noise on the input signal which might otherwise give rise to a false positive determination as to the presence of an OFDM signal.

At step 130, the rate of growth values are normalised in order to mitigate the impact of effects that can influence the correlation values for all LOI, such as a common gain. The normalisation of the rate of growth values allows a subsequent threshold comparison to be performed based on a relative, rather than absolute, value. The normalisation of the rate of growth values may comprise two steps, namely a first step in which a normalisation factor is determined. The normalisation factor may be based on an average of the rate of growth values determined at an instance in time across some or all of the LOI. In a second step, the normalisation factor may be applied to each rate of growth value to generate normalised rate of growth values (hereinafter NRG values), with each NRG value corresponding to a respective rate of growth value. For example, where the rate of growth values are arranged in groups, the normalisation factor may be generated based upon an average rate of growth across all LOI in a current group, i.e. the group based on accumulated correlation results for the most recently captured blocks of data samples. The NRG values represent a normalisation of rate of growth values with respect to an average rate of growth at a given instance in time.

At step 140, it is determined whether or not an OFDM signal is present in the received input signal based upon the NRG values. The determination as to whether or not an OFDM signal is present may comprise determining whether or not any of the plurality of NRG values meets or exceeds a pre-determined signal threshold. If one or more of the NRG values meets or exceeds the pre-determined signal threshold, then it can be determined that there is an OFDM signal present in the input signal. Conversely, if none of the NRG values meets or exceeds the pre-determined signal threshold, then it can be determined that there is no OFDM signal present.

Figure 2:
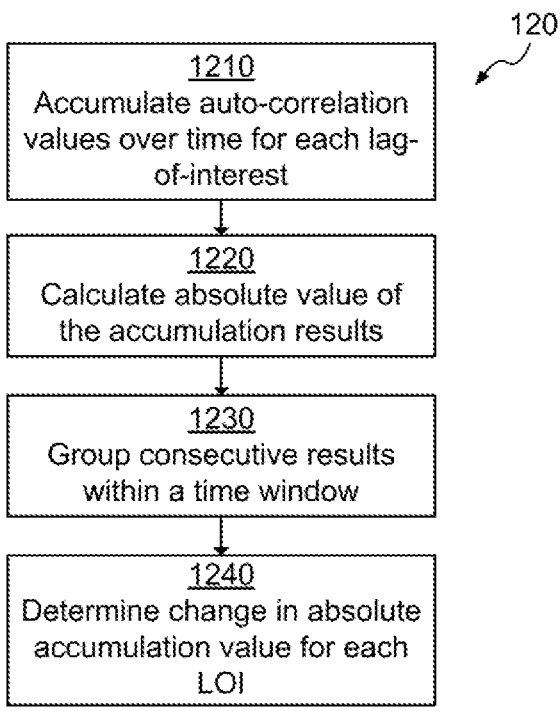
FIG. 2 illustrates an example method for determining a rate of growth value for each of a number of lags of interest.
Figure 3A:
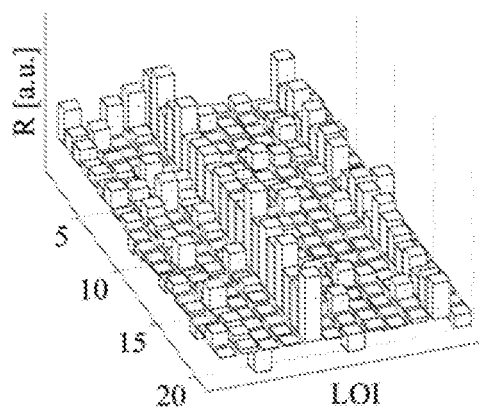
FIGS. 3($a$) to 3($d$) illustrate example values generated according to an example implementation of the steps of FIG. 2.

FIG. 2 illustrates an example method of determining rate of growth values for each of a plurality of LOI, across a plurality of blocks of samples based on calculated auto-correlation values. In an example, the method of FIG. 2 may implement step 120 of FIG. 1. The method begins at step 1210, at which auto-correlation values are accumulated over time for each LOI. This is illustrated with reference to FIGS. 3(a) and 3(b). FIG. 3(a) illustrates a set of initial correlation values generated at step 110 of FIG. 1. Specifically, auto-correlation values R[x,y] are calculated for x different blocks of data samples and for y lags-of-interest, giving x*y auto-correlation values. In FIG. 3(a), x=21 and y=12.

Figure 3B:
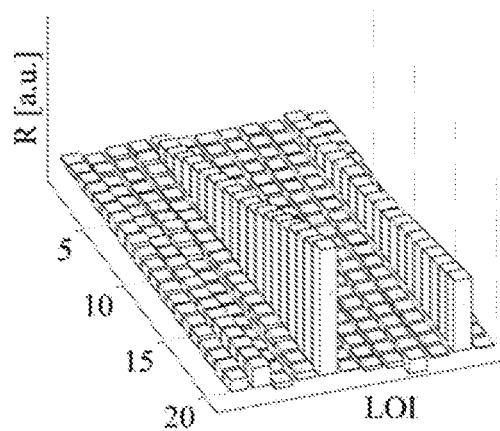

FIG. 3(b), illustrates the resultant accumulated values generated by performing step 1210. As can be seen from FIG. 3(b), the auto-correlation values are separately accumulated for each LOI. The accumulated value associated with a combination of LOI and number of blocks of data samples (x,y) may be given by $\Sigma_{i=0}^{i=x} = R[i,y]$. The accumulation operation takes place by adding each newly generated auto-correlation result (for a given lag) that is generated for a block of data samples to the previously accumulated value. As shown in FIG. 3(b), there is an accumulation result generated for each received block of data samples.

Having completed step 1210 at which accumulated values are generated based on received blocks of data samples, method 120 proceeds to step 1220 at which the absolute value of the accumulation results is determined. This step may be performed at the same time as step 1210—i.e. as part of the same operation or calculation. In so doing, the resultant absolute accumulated value A associated with a combination of LOI and a particular batch of samples (x,y) may be given by: $A(x,y) = |\Sigma_{i=0}^{i=x} R[i,y]|$. It will be appreciated that the absolute value of the accumulation results need not be performed each time an accumulation value is generated. Each absolute accumulated value is associated with a particular block of data samples.

Figure 3C:
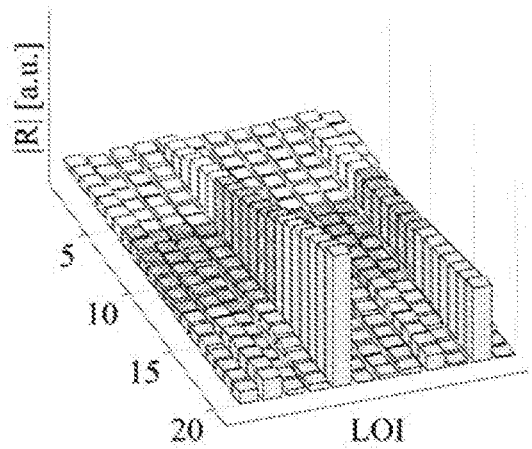

Having generated one or more absolute accumulated values for each LOI, method 120 proceeds to step 1230 at which the absolute accumulated values are processed in groups of consecutive results within a given time-window. The size of a given time-window that defines the size of a group may be pre-determined. The size of the groups may be selected in advance based upon a trade-off between the frequency in which the NRG values are to be updated and the susceptibility of the NRG values to noise on the accumulated correlation values. Larger groups are more resilient to fluctuations in the correlation values but may be slower to update the NRG values to reflect the absence/presence of an OFDM signal. In contrast, smaller groups may more regularly update the NRG values but will be less resilient to any fluctuations in the correlations values. The number of consecutive absolute accumulated values that are present in a particular group may depend upon on the size of a block and the number of blocks in a group. FIG. 3(c) illustrates an example of the grouped absolute accumulated values. In FIG. 3(c), three groups are illustrated; namely a first group comprising absolute accumulated values for the first seven blocks of samples (for each LOI), a second group comprising absolute accumulated values for the next seven blocks of samples (for each LOI), and a third group comprising the subsequent seven blocks of samples (for each LOI).

Having allocated consecutive absolute accumulated value to one of a number of different groups, the change in absolute accumulated value for the group is determined at step 1240. This change may be determined by calculating the difference in absolute accumulated value from the last generated absolute accumulated value to the first generated absolute accumulated value in a particular group. Put another way, each group has a number of absolute accumulated values each of which were generated for a corresponding block of data samples that were consecutively received. For a given group, the absolute accumulated value associated with the first received block of samples may be subtracted from the absolute accumulated value associated with the most recently received block of samples within that group.

Figure 3D:
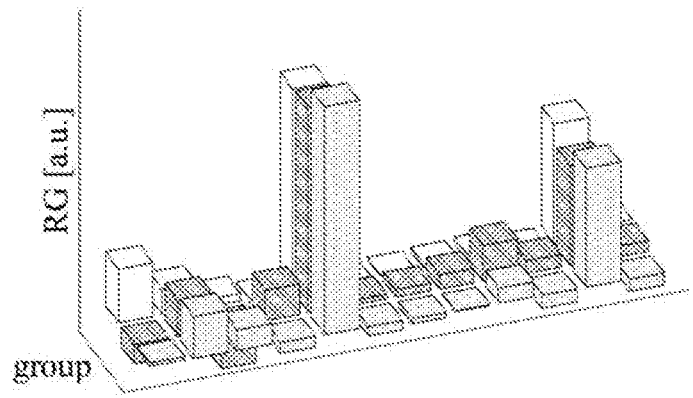

Alternatively, the change in absolute accumulated value may be based upon a determination between respectively positioned absolute accumulated values in consecutive groups. For example, the change may be based on a difference between the last absolute accumulated value in the current group and the last absolute value in the previously processed group. A rate of growth value may be determined for a group of blocks of data samples, where each group comprises two or more blocks and each block comprises a sufficient number of samples for an auto-correlation value to be calculated. For example, the rate of growth value may be determined for LOI yin group j using the following calculation $RG(j,y)=A(m,y)-A(n,y)$, where RG is the rate of growth value, m is the absolute accumulated value associated with the most recently generated block of samples in group j, and n is the absolute accumulated value associated with the next most recently generated block of samples. FIG. 3(d) illustrates example rate of growth values for each lag of interest and for each of the three groups illustrated in FIG. 3(c). As can be seen, the fifth and eleventh LOI have significantly greater rate of growth values than the other LOI.

It will be appreciated that the rate of growth calculation may be performed in other ways. For example, in some arrangements it is possible for the accumulated value to be reset at the start of each group. In this way, the accumulated value at the end of each group is in effect, the rate of growth value that for group.

FIG. 4 illustrates an example method 130 for performing the normalisation of the rate of growth values described at step 130 of FIG. 1. The method begins at step 1310 at which a normalisation factor is calculated. One approach for calculating a normalisation factor is described below, although it will be appreciated that a number of different approaches for calculating the normalisation factor are envisaged.

In an example, the normalisation factor is determined by calculating the mean of the rate of growth values at a given instance in time across all LOIs. The rate of growth values at a given instance in time may be the most recently determined plurality of rate of growth values. The most recently determined rate of growth values may be those determined based on a most recently processed group of blocks of data samples. For example, the rate of growth values may be summed and divided by the number of rate of growth values calculated at a given instance in time—and is thus dependent upon the number of LOIs.

Having calculated the normalisation factor, method 130 proceeds to step 1320 at which the determined rate of growth values are normalised to generate normalised rate of growth values (NRG values). The NRG values may be determined by applying to each rate of growth value the normalisation factor. For example, the normalisation factor may be applied by dividing each rate of growth value by the normalisation factor. The NRG values provide an indication as to whether or not an OFDM signal is present. Where there is a high NRG value for a group (or groups), it can be assumed than an OFDM signal is present, at least for the groups of blocks of samples where the NRG is high.

In some arrangements, the NRG values may be biased by the presence of an echo and/or interference on the input signal. Where an echo and/or interference is present, the peaks of the normalised rate of growth values (e.g. of the fifth and eleventh LOI in FIG. 3(c)) may not properly represent the presence of an OFDM signal. Normalisation can be affected since the normalisation factor will be biased in value by the echo/interference. In some arrangements, it is possible to improve the reliability of presence determination by accounting for these false peaks. To improve the reliability of the presence determination, a different normalisation factor may be generated that does not account for the peaks where a problematic echo/interference occurs.

An example of the optional calculation and application of the adjusted normalisation factor is illustrated in FIG. 4. After calculation of the NRG values at step 1310 and application of these NRG values at step 1320, the method 130 may optionally proceed to step 1330. At step 1330, the NRG values may be regarded as initial NRG values. The initial NRG values may be processed to identify whether any of the values meet or exceed a peak threshold. If so, the normalisation factor may be refined to generate an adjusted normalisation factor.

To generate the adjusted normalisation factor, each NRG value may be compared with a peak threshold as set out in step 1330 of FIG. 4. The peak threshold represents an NRG value above which it can be determined that the NRG value was reached due to the presence of a problematic characteristic of the input signal, such as an echo or interference. In the example of FIG. 4, the threshold may be set at 14.0. Where an NRG value equals or exceeds the peak threshold, the normalisation factor used to perform normalisation is adjusted to discard the rate of growth value associated with that NRG value. In this way, any bias in the peaks arising from an echo and/or interference is removed from the normalisation factor. Rate of growth values that are identified as having a value that meets or exceeds the peak threshold are discarded from the calculation of the adjusted normalisation factor.

In one approach, rate of growth values associated with the NRG values that exceed the peak threshold are excluded and the mean of the remaining rate of growth values is used to calculate the adjusted normalisation factor. The adjusted normalisation factor is then applied to all of the rate of growth values (including those that were discarded from the calculation) to determine a final set of NRG values based on the adjusted normalisation factor.

To do this, at step 1340, a final set of NRG values is calculated and used in identifying the presence or absence of an OFDM signal. At step 1340 of FIG. 4, steps 1310 and 1320 are effectively repeated without the identified NRG peak values. For example, the normalisation factor is re-obtained by recalculating the mean rate of growth value across LOI without including rate of growth values that are associated with an NRG value that met or exceeded the peak threshold. In this way, the mean is based only on the rate of growth values that are deemed to be unaffected by echo and/or interference. Once the adjusted normalisation factor is determined, the adjusted normalisation factor is applied to all of the rate of growth values (including the rate of growth values that are associated with NRG peaks deemed to be affected by echo and/or interference) in order to generate final normalised rate of growth values that are to be used in step 140 of FIG. 1.

FIG. 5 illustrates an OFDM signal detector 500 according to an example of the present disclosure, which may be configured to implement the methods of FIG. 1, FIG. 2 and/or FIG. 4. OFDM signal detector 500 comprises an analogue-to-digital converter (ADC) 510, a correlation calculation module 520, a plurality of accumulation modules 530, a plurality of absolute value modules 540, a plurality of switching elements 550, a plurality of register pairs 560, a normalised rate of growth (NRG) module 570, a threshold comparison module 580. The example OFDM signal detector 500 may be configured to implement one or more of the methods of FIGS. 1 to 4.

OFDM signal detector 500 comprises an analogue-to-digital converter (ADC) configured to process an input signal received from an antenna and to convert the received analogue signal to a number of digital samples. In some examples, the rate at which samples are captured by the ADC may relate to the widest bandwidth expected in a received OFDM signal. For example, where the signal to be detected is a DVB-T signal, the sampling rate may be set to accommodate 8 MHz bandwidth-mode.

The digital samples of the input signal are passed to a correlation calculation module 520 one block of data samples at a time. For example, the ADC may be configured to generate a block of data samples and to pass that block to the correlation calculation module. The correlation calculation module 520 may be configured to perform an inverse Fourier transform of the absolute value of the Fourier transform of a block of data samples. The size of a block of samples may be defined based on the maximum symbol duration of the expected OFDM signal. For example, a block may comprise 32,768 consecutively captured samples.

The correlation calculation module 520 may be configured to generate a number of correlation results based on a number of LOI and a particular block of data samples. The LOI may comprise one or more lags defined based upon fractions of the OFDM symbol duration that give rise to strong correlations indicating the presence of an OFDM signal. In practice, many lags provide a corresponding correlation and thus many different combinations of lags could be used to define the LOI. In a particular example, where the OFDM signal is a DVB-T signal, the inventors have recognised that lags that correspond with ⅓, ⅔, and 3/3 of the OFDM symbol duration are useful in determining the presence or absence of an OFDM signal. Similarly, for some configurations of a DVB-T2 signal, lags that correspond with ⅓, ⅔ and 3/3 may be useful. These lags may also be useful in detecting the presence of other OFDM signals. Alternatively, different lags timing may be useful in detecting the presence of other OFDM signals. Thus, in some arrangements one or more of these lags could be used as the LOI. In some arrangements a lag that corresponds with the Guard Interval Rate (GIR) plus the OFDM symbol duration may be additionally or alternatively be used as a LOI.

The correlation calculation module 520 is configured to generate a pre-determined number of correlation results for a particular block of data samples, the pre-determined number corresponding with the number of LOI used in a particular implementation. In some implementations, the correlation results may also depend on particular combinations of signal parameters. For example, an OFDM signal may have a particular GIR, bandwidth mode, and FFT window size. In the example of a DVB-T signal, the GIR can be one of 1/32, 1/16, ⅛, or ¼; the bandwidth mode can be one of 5 MHz, 6 MHz, 7 MHz, and 8 MHz; and the FFT window size can be one of 2K, 4K, and 8K. In this example, there are 48 different combinations of these signal parameters. If 4 different LOIs are evaluated per combination and 48 different combinations of signal parameters are considered, there may be 192 different LOI. Therefore, in some arrangements, 192 different correlation results may be generated. However, it will be appreciated that it is not necessary for all of the 192 different combinations of LOI to be generated.

The signal detector 500 further comprises a plurality of accumulation modules 530. There may be an accumulation module 530 for each LOI. Each accumulation module is configured to accumulate the values of correlation results for a specific LOI, each correlation result generated at a particular instance of time received as a result of processing a respective block of samples. In an example, a particular accumulation module is configured to accumulate more than one correlation result for a particular LOI and for a given combination of signal parameters, each correlation result deriving from the correlation of a consecutive block of data samples using the particular LOI for those combinations of characteristics.

After each block of data samples is processed by the accumulation modules 530, the accumulation value at each accumulation module is passed to a corresponding absolute value module 540. The absolute value modules 540 are configured to determine absolute values of the received accumulation value to generate a respective absolute accumulation value. In some arrangements, this calculation may occur each time a new accumulation value is generated or may be performed on some of the generated accumulation values. The absolute value calculation and the accumulation calculation may be combined and performed in a single module.

In signal detector 500, each absolute value module 540 is associated with a corresponding switching element of a plurality of switching elements 550. The switching elements are configured to selectively pass the absolute values to one register of a respective pair of registers. For a particular switching element, the selective passing of the absolute value may depend on which of block of data samples of a group of blocks is currently being handled. The switching elements are configured to implement one or more switching schemes to implement the grouping of absolute accumulation values, with each register handling a different group. The signal detector 500 may implement larger groupings of registers, such as three registers associated with each absolute value register. Each switching element implements the same switching scheme to ensure consistent grouping of values.

In an example switching scheme, the switching elements are configured to pass a first absolute value of a group to a first register of an associated pair of registers.

The switching elements are also configured to pass a final absolute value of a group to a second register of the associated pair of registers. In the example of FIG. 5, the top switching element may be configured to pass the first absolute value of a group to register 1B and may be configured to pass the final absolute value of the group to register 1A.

The switching elements may be configured so that only the first and final absolute values of a particular group are passed to the registers and are subsequently compared to calculate a rate of growth value. In this way, other absolute values generated may be discarded or stored and overwritten by subsequent absolute accumulated values. The use of consecutively generated absolute values in illustrated in relation to FIG. 6(*a*). In particular, FIG. 6(*a*) is a table that illustrates whether or not a particular absolute value is stored or discarded based upon a number of example group sizes. The top row 610 illustrates each of eight different absolute values that are consecutively generated by the top absolute value module 540 of FIG. 5. Each of the eight absolute values is associated with a consecutively received block of data samples. Absolute value 1 of FIG. 6(*a*) is the first calculated absolute value based on the first received block of data samples, whilst absolute value 8 is the final received value.

Row 620 illustrates example usage of the absolute values based on a group size of three. In this example, the first received value of a first group of values is absolute value 1 and is thus stored in register 1B. The final received value of the first group of values is absolute value 3 (due to the group size being three), which is therefore stored in register 1A. Absolute value 2 is discarded since it is neither the first nor the last absolute value of the first group. A first rate of growth value may subsequently be calculated by subtracting, after absolute value 3 is stored, the value in register 1B from the value in register 1A. Absolute value 4 is the first absolute value of the second group and is thus stored in register 1B (optionally in place of absolute value 1). The final value of the second group is absolute value 6 which is thus stored in register 1A. The second value of the second group (absolute value 5) is discarded since it is neither the first nor last value of the second group. Similarly, a second rate of growth value is subsequently determined by subtracting the absolute value 4 stored in register 1B from absolute value 6 stored in register 1A. The first value of the third group is absolute value 7 which is therefore stored in register 1B whilst absolute value 8 is discarded and absolute value 9 (not shown) would be stored in register 1A. A third rate of growth value can then be calculated accordingly.

Row 630 illustrates a similar arrangement to row 620, but with the group size being four absolute accumulation values. For a first group the first value is absolute value 1 which is stored in register 1B whilst the last value in the first group is absolute value 4 which is stored in register 1A. In this case, the middle two absolute values of a group are discarded. Row 640 illustrates a similar arrangement where the group size is five absolute values. The first of five values, absolute value 1, is stored in register 1B and the last of five values, absolute value 5, is stored in register 1A. Row 650 illustrates a further example where the group size is 6 and row 660 illustrates a further example where the group size is 7.

FIG. 6(*b*) illustrates a number of alternative switching schemes based on nine consecutively generated absolute accumulated values 610 in which each consecutively absolute accumulated value is stored in the same register based on the switching elements. In this way, the newly stored absolute accumulated values overwrite the previously stored absolute accumulated value in that register. When a pre-determined number of values have been stored in a particular register, the switching elements switch to the other register of the pair and store a pre-determined number of values in that register. The pre-determined number of values is defined by the group size.

Row 620 illustrates a switching scheme in which the final absolute accumulated values of the first and second groups are selected for comparison based on a group size of three values. In particular, in row 620, the final value for the first group is absolute value 3 which is the third value to be stored in register 1A. Subsequently, the switching element switches to enable values to be stored to register 1B. Absolute values 4 to 6 are consecutively written into register 1B. After absolute value 6 has been written to register 1B, the switching element switches again to return to register 1A. Before a new value (absolute value 7) is written to register 1A, a calculation based on the values stored in registers 1A and 1B is performed (as illustrated by the dark boxes of FIG. 6(*b*)). Then the process repeats with three new values consecutively written to register 1A and, after absolute value 9 is written to register 1A, the switching element again switches to register 1B.

Row 630 illustrates a further switching scheme in which the final absolute accumulated values of the first and second groups are selected for comparison based on a group size of four values. The switching scheme 630 operates in the same manner as described above in respect of row 620, but with the switching occurring after four consecutive values have been written into a register (instead of three). As can be seen, absolute accumulated values 4 and 8 are compared with one another. Row 640 illustrates a further switching scheme in which the final absolute accumulated values of the first and second groups are selected for comparison based on a group size of five values. As can be seen, absolute accumulated value 5 and 8 is selected for comparison with absolute value 10 (not shown).

The switching schemes described above may be repeated for each of n pairs of registers. Having stored absolute accumulation values in corresponding pairs of registers, the signal detector 500 is configured to pass the pairs of absolute values to a NRG module 570 which is configured to perform a normalised rate of growth calculation.

FIG. 7 illustrates an example normalised rate of growth (NRG) module 570 according to an example of the present disclosure. NRG module 570 comprises n subtraction modules 571-1 to 571-*n*, n multiplication modules 572-1 to 572-*n*, an n-input addition module 573, and a reciprocal module 574, where n is the number of LOI.

Each subtraction module 571-1 to 571-*n* is configured to receive a pair of absolute values from a particular pair of registers and to subtract the older from the newer value. For example, the value held in register 1B may be subtracted from the value held in register 1A. The result generated by each subtraction module can be considered to be the rate of growth value for that particular LOI. The rate of growth value may be passed to two elements of the NRG module 570. Specifically, the subtraction result from each subtraction module is passed as an input to the n-input addition module 573 and to a corresponding multiplication module of the n multiplication modules 572-1 to 572-*n*.

The n-input addition module is configured to add together each of the n subtraction results generated from the subtraction modules to form a summed result. The summed result is passed to reciprocal module 570 which is configured to perform two calculations. Firstly, the reciprocal module is configured to divide the summed results by n, where n is the number of inputs to the addition module. This division calculation generates a mean of the subtraction results, i.e. the mean of the rate of growth values, which is the normalisation factor. The second calculation performed by the reciprocal module 570 is to calculate a reciprocal of the mean value which can be considered to be the reciprocal of the normalised rate of growth value.

The reciprocal of the mean value that is calculated by the reciprocal module 570 is passed to each of n multiplication modules 572-1 to 572-*n*. The multiplication modules 572-1 to 572-*n* are configured to perform a multiplication operation based on the reciprocal of the normalised rate of growth value received from the reciprocal module 570 and the received output from a respective subtraction module to generate a respective normalised rate of growth value for a particular LOI. The respective normalised rate of growth values (one per LOI) are from the NRG module 570. It will be appreciated that the multiplication of a rate of growth value with the reciprocal of the normalisation factor can be considered to be equivalent to dividing the rate of growth value by the normalisation factor.

Returning to FIG. 5, the outputs of the NRG module 570 are passed to the threshold comparison module 580 at which a comparison between each output of the NRG module (i.e. each normalised rate of growth value) is compared with a pre-determined signal threshold. If any of the NRG values passed to the threshold comparison module 580 meet or exceed the pre-determined signal threshold, it is determined that an OFDM signal is present in the received input signal. If none of the NRG values passed to the threshold comparison module 580 meet or exceed the pre-determined signal threshold, then it is determined that an OFDM signal is not present in the received input signal. The threshold comparison module 580 may be configured to output an indication as to whether or not an OFDM signal is present in the received input signal. The indication may be in the form of a signal, the value or level of which indicates the presence or absence of an OFDM signal. The receiver may further by configured to selectively enable or disable further elements of the receiver (or of other modules) based upon the determination.

Signal detector 500 may operate to perform the method of FIG. 1. The correlation calculation module 520 is configured to calculate auto-correlation results in accordance with step 110 of FIG. 1. The auto-correlation results are accumulated by accumulation module 530 in accordance with step 1210 of step 120 of FIG. 2. The absolute value of the accumulation results is calculated using absolute value modules 540 in accordance with step 1220 of FIG. 2. At step 1230 of FIG. 2, consecutive results are grouped. The results are grouped by the switching elements 550 selectively switching the absolute accumulated values generated by the absolute value modules 540 into particular registers of the pair of registers 560. In particular, the grouping of values is performed on-the-fly. By switching the accumulated values between first and second registers of a pair of registers associated with a particular absolute value module, it is possible to de-limit consecutively processed absolute accumulated values into groups. As discussed previously, the size of the groups may affect the rate at which switching occurs using switching elements 550. Furthermore, the size of a group may impact the latency in making a determination as to the presence or absence of an OFDM signal. This is because it is necessary to wait for consecutive groups of blocks of data signals to be processed. In practical examples of a DVB-T receiver, group sizes between 7 and 13 blocks of data samples have provided a suitable trade-off between latency and accuracy. Accordingly, at the end of step 1230, the first absolute value of a group is stored in a register of a pair of registers and the last absolute value of a group is stored in another register of the pair of registers.

At step 1240 of FIG. 2, an absolute accumulated value of a group of accumulated values is subtracted from another absolute accumulated value of that group. This subtraction calculation is performed for different absolute accumulated values in respective subtraction modules 571-1 to 571-n. At the end of step 1240, rate of growth calculations are determined for each LOI. The output of subtraction modules 571-1 to 571-n can be considered to be rate of growth values.

At step 130, the rate of growth values are normalised. The normalisation of the rate of growth values is performed by elements 573, 574, and 572-1 to 572-n of FIG. 7. Specifically, at step 1310 a normalisation factor is determined by calculating the mean value of the rate of growth values in the final group. In the arrangement of FIG. 5, the final group can be considered to be associated with the most recently calculated first and final accumulated values. As such, the rate of growth values are the values that were determined by the subtraction modules 571-1 to 571-n. Accordingly, the n-input addition module 573 is configured to add together the growth values output from the subtraction modules and the reciprocal module 574 is configured to divide the addition result by n in order to determine the mean value of the rate of growth values. This mean value of the rate of growth values can be considered to be the normalisation factor to be applied to the rate of growth values. To apply the normalisation factor to the rate of growth values, as set out in step 1320 of FIG. 4, a reciprocal operation is applied to the mean value of the rate of growth values. The output of the reciprocal operation forms the output of the reciprocal module 574, which is passed as an input to each multiplication module 572-1 to 572-n. Each multiplication module 572-1 to 572-n is configured to perform a multiplication operation between the respective output from a subtraction module 571-1 to 571-n (i.e. a rate of growth value) and the reciprocal of the normalisation factor in order. This multiplication can be considered to be equivalent to a division of the rate of growth value by the normalisation factor in accordance with step 1320. The resultant normalised rate of growth values are then passed to the threshold comparison module 580 at which it is determined whether or not an OFDM signal is present based on a comparison of the received NRG values with a pre-determined signal threshold in accordance with step 140 of FIG. 1 and a corresponding indication is output.

Methods and apparatuses described herein can also be used in applications where it is desirable to detect/determine the specific parameters of a received OFDM signal. OFDM signals are defined by a number of different signal parameters including guard-interval rate (GIR), FFT window size, and bandwidth mode. To correctly decode an OFDM signal, the receiver needs to know the values of one or more of these signal parameters that were used to generate the OFDM signal. In practice, and for most forms of OFDM signals, each signal parameter can take one of a number of pre-determined possible values. For example, in DVB-T, the bandwidth mode may be one of 5 MHz, 6 MHz, 7 MHz, and 8 MHz; the GIR may be one of $\frac{1}{32}$, $\frac{1}{16}$, $\frac{1}{8}$, and $\frac{1}{4}$; and the FFT size may be one of 2K, 4K, and 8K.

Known approaches for determining which combination of signal parameters an OFDM signal has involve scanning the OFDM signal for each possible combination of signal parameters in turn until the most likely or strongest correlation combination is determined. Scanning each combination of possible signal parameters can be time consuming, since it is necessary to process each combination in turn and may require capturing a number of blocks of data samples, one for each combination of signal parameters. An increase in latency in detecting the signal parameters of an OFDM signal is undesirable since this can lead to a delay in locking onto and decoding the OFDM signal. For example, where the OFDM receiver is a DVB receiver, the latency in detecting the signal parameters of the DVB signal can result in a delay in the received signal being processed and displayed.

An approach for determining signal parameters which scans different combinations of signal parameters is illustrated in FIG. 8. FIG. 8 illustrates a OFDM parameter estimator 800 configured to detect the parameters of a received OFDM signal. The OFDM parameter estimator 800 comprises an analogue-to-digital converter (ADC) 810, a correlation module 820, a one-tap infinite impulse response (IIR) filter 830, a threshold comparison module 840, a switch 850, a combination generator 860, n registers 870, and a maximum value determination module 880. Other modules (not shown) may be included between the antenna and the ADC 810 in order to perform demodulation of the OFDM signal.

The OFDM parameter estimator 800 is configured to calculate a metric for each possible combination of configuration values that explores the correlation pattern introduced by the GIR of the incoming signal. The combination generator 860 is configured to select a combination of signal parameters for the OFDM signal. For example, a first GIR value, a first FFT-size value, and a first bandwidth mode may be selected for testing in a first operation. In a second operation, a second GIR value, a second FFT-size value, and a second bandwidth mode may be selected. Each possible combination of signal parameters may be tested in sequentially performed operations.

A particular combination of signal parameters is tested and a correlation metric is determined that indicates the degree to which the received OFDM signal correlates for that combination of signal parameters. Where the correlation metric indicates a strong correlation (e.g. has a high value), the more likely it is that the particular combination of signal parameters were used to generate OFDM signal. The combination of signal parameters that are being tested in a correlation operation is defined by the combination generator 870. The combination generator 870 provides a combination of signal parameters in successive operations until all (or a sufficient number of) combinations have been tested and corresponding correlation metrics have been generated.

At ADC 810, the incoming OFDM signal is sampled to generate, from an analogue signal, a digital signal. The manner in which the conversion is performed is controlled by the combination generator which defines the bandwidth mode used for the conversion. The digital signal is then passed to the correlation module 820. The correlation module is configured to perform an auto-correlation operation R with a lag of $N_u$ samples. The manner in which the auto-correlation operation is performed is also controlled by the combination generator which defines the FFT-size $N_u$. The correlation result is then passed to IIR filter 830 which combines the current output of the correlator 820 with a $N_u+N_g$ delayed version of the same output (where $N_g$ is the GIR duration in samples and is also defined by the combination generator 860). With this delay in the IIR filter 830, correlation peaks occurring with that periodicity will appear boosted at the filter output. The output of the IIR filter 830 is then passed to the threshold comparison module 840 which determines whether or not the correlation metric meets or exceeds a pre-determined threshold $D_t$. If so, the correlation metric for that combination of signal parameters is passed by switch 850 to a particular register of the plurality of registers 870.

This process is repeated for different combinations of signal parameters until a plurality of correlation metrics are stored in corresponding registers of the plurality of registers 870. Once the combination generator 860 has cycled through the possible combinations of signal parameters, the maximum value determination module 880 is configured to determine which correlation metric has the highest correlation (e.g. the largest value). The maximum value determination module 880 is configured to provide an output indicating the determined signal parameters of the received OFDM signal based on the combination of signal parameters that were used to obtain the correlation metric having the highest correlation.

In the arrangement of FIG. 8, the combination generator 860 is configured to operate on samples of the received OFDM signal using a single combination of signal parameters at a time. It is therefore necessary to perform successive correlation operations on the received signal, each correlation operation associated with a combination of signal parameters. For example, the combination of signal parameters first tried or last tried may be the correct combination but the receiver will only be able to make this determination once all combinations have been tried. A high latency in the receiver making a determination as to the correct combination of signal parameters is undesirable since the receiver is unable to decode OFDM signal data until the signal parameter combination has been determined. The approaches for determining the signal parameters of an OFDM signal described herein are low latency approaches that do not rely upon successively determined correlation results for each combination of signal parameters. Instead, in the approaches described herein it is possible for a determination as to the signal parameters to be made using fewer correlation operations.

Figure 9:
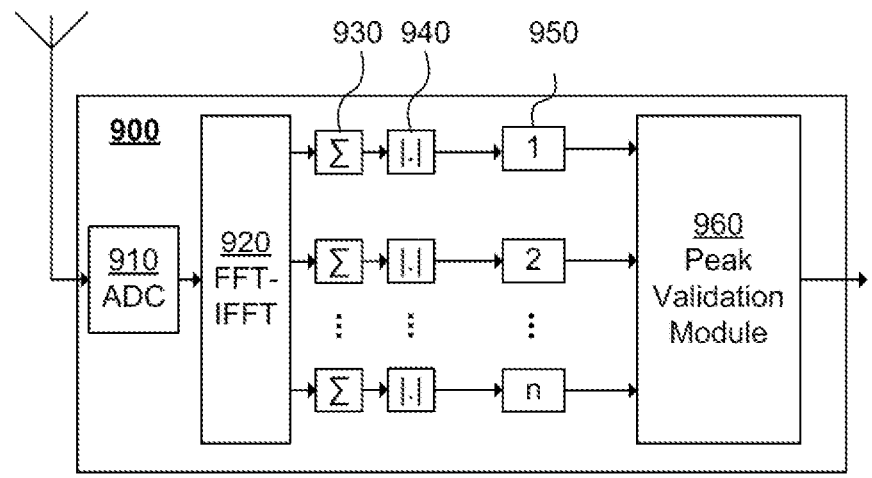
FIG. 9 illustrates an example OFDM parameter estimator for determining signal parameters of an OFDM signal according to the present disclosure.

FIG. 9 illustrates an OFDM parameter estimator 900 according to the present disclosure which is configured to determine the signal parameters of a received OFDM signal. The OFDM parameter estimator 900 comprises an analogue-to-digital converter (ADC) 910, a correlation module 920, a plurality of accumulation modules 930, a plurality of absolute value modules 940, a plurality of registers 950, and a peak validation module 960. Other modules (not shown) may be included between the antenna and the ADC 910 in order to perform demodulation of the OFDM signal.

In operation, the parameter estimator 900 is configured to receive an OFDM signal which is then passed to the ADC 910 at which the analogue signal is sampled to generate a digital signal. In some arrangements, the ADC 910 is not required to perform conversion in a number of bandwidth modes. Instead, in the arrangement of FIG. 9, the ADC 910 may be configured to perform conversion at the highest possible bandwidth mode (i.e. widest bandwidth) of the OFDM signal that is expected to be received. For example, where the OFDM signal is a DVB-T or DVB-T2 signal, the ADC 910 may operate in a 8 MHz bandwidth mode.

The digital signal generated by the ADC 910 is passed to correlation module 920. The correlation module 920 is configured to perform an auto-correlation operation on the samples of the OFDM signal by applying a fast Fourier Transform (FFT) on a window of samples and then applying the inverse fast Fourier Transform (IFFT) to the result. In this way the operation of the correlation module 920 may be the same as the operation of the correlation module 520 illustrated in FIG. 5.

The correlation results generated by the correlation module are passed to respective accumulation modules 930 at which a number of correlation module results are accumulated. In this way, the operation of the accumulation modules 930 may be the same as the operation of the accumulation modules 530 illustrated in FIG. 5. The accumulated correlation results generated in the accumulation modules 930 are passed to corresponding absolute value modules 940 at which the absolute value of the accumulation correlation results are generated. In this way, the operation of the absolute value modules 940 may be the same as the operation of the absolute value modules 540 illustrated in FIG. 5.

The OFDM parameter estimator 900 comprises n registers that are each configured to store an absolute accumulated correlation result. Each of the absolute accumulated correlations results represents a correlation peak that is assessed in order to determine the combination of signal parameters of the received OFDM signal. The n correlation peaks are passed to the peak validation module 960 in which each peak is validated. The peak validation procedure is configured to check whether each peak is a valid peak. A valid peak is a correlation peak that represents a valid auto-correlation result. A valid peak value represents a sufficient correlation to indicate that the associated combination of signal parameters may be a valid combination of signal parameters for the input signal. A valid peak may be unaffected by noise and/or an echo signal. The peak validation module 960 is therefore configured to identify which of the correlation peaks are valid peaks. The peak validation procedure will be described in more detail.

Once the peak validation module 960 has determined which of the correlation peaks are valid peaks, the peak validation module 960 is configured to identify which combination of signal parameters has the greatest number of valid peaks associated therewith. The combination of signal parameters having the greatest number of valid peaks is deemed to be the combination of signal parameters used in the OFDM signal. Other combinations that achieve the same number of valid peaks are also output as possible candidates.

Figure 10A:
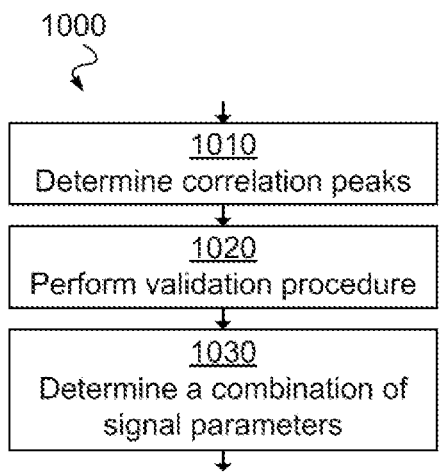
FIG. 10($a$) illustrates an example method for determining the combination of signal parameters of an OFDM signal according to the present disclosure.
Figure 10B:
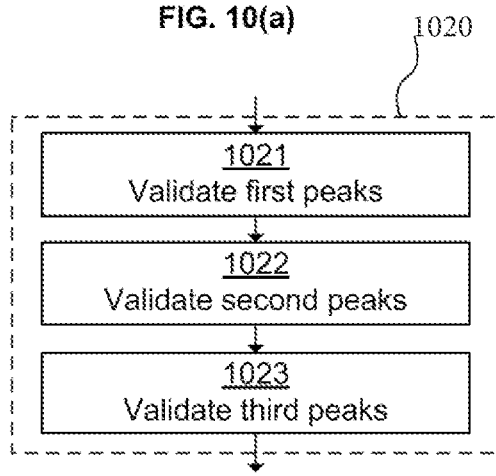

FIG. 10(*a*) illustrates an example method for determining the combination of signal parameters of an OFDM signal according to the present disclosure. The method begins at step 1010 at which correlation peaks are determined. In particular, the resultant correlation peaks may comprise a series of absolute accumulated correlation results. Each correlation peak may be considered to be a correlation result at a particular lag derived by a correlation module, such as the correlation module 920 of FIG. 9. The correlation peaks may be obtained at the highest possible bandwidth mode of the OFDM signal (i.e. the widest bandwidth), such as 8 MHz for a DVB-T signal.

Having completed step 1010, correlation peaks are allocated into sets of correlation peaks, each set of correlation peaks associated with a corresponding combination of signal parameters. The correlation peaks are then placed into sets of correlation peaks, with each set of peaks being associated with a particular combination of possible signal parameters for the OFDM signal. A single correlation peak may be placed into more than one set of peaks such that a correlation peak appears more than once across the sets of peaks. The placement of correlation peaks is performed based on LOI for each combination of signal parameters. As described earlier, the arrangement may have a number of LOI that may depend on the specific application of the OFDM receiver. In some arrangements, the LOI may be ⅓, ⅔ and 3/3 of the OFDM symbol duration, as well as an optional additional lag-of-interest of the duration of the OFDM symbol plus the guard interval (i.e. $N_u+N_g$). Where that is the case, each set of correlation peaks may comprise three (or optionally four) peaks. For example, a set of peaks may comprise a first peak, a second peak, and a third peak. A first peak of the set may be allocated based on a peak from the plurality of peaks that has a lag that corresponds with a ⅓ symbol duration for the combination of signal parameters associated with that set. Similarly, the second peak of the set may be allocated based on a peak from the plurality of peaks that has a lag that corresponds with a ⅔ symbol duration for that combination of signal parameters associated with that set. The third peak of the set may be allocated based on a peak from the plurality of peaks that has a lag that corresponds with a 3/3 symbol duration for that combination of signal parameters associated with that set. It will be appreciated that the particular lag that corresponds with a 3/3 symbol duration may depend upon the combination of signal parameters associated with that set of peaks. For example, the symbol duration may depend upon the FFT-size $N_u$. Accordingly, the lag value used for a particular LOI may differ between sets depending on the lag for that combination of signal parameters. In some sets, the lag value used for a particular LOI may be the same. In general, each peak in a set may correspond with a LOI for that combination of signal parameters It will be appreciated that alternative or additional LOI can be used for determining the signal parameters of an OFDM signal. In an example, three LOI are determined namely ⅓, ⅔, and 3/3 of the symbol duration. However, in other implementations fewer LOI may be used, such as ⅓ of the symbol duration and one of ⅔ and 3/3 of the symbol duration. In other implementations, additional fractions of the symbol duration may additionally be used as additional LOI—such as ⅙, ⅜, and ⅚ of the symbol duration.

At step 1020, a validation procedure is performed on the sets of correlation peaks in order to validate one or more of the correlations peaks in the sets of correlation peaks. FIG. 10(*b*) illustrates an example method of performing a validation procedure on each peak in the sets of peaks. In the example of FIG. 10(*b*), each set of correlation peaks comprises three LOI. Specifically, each set of correlation peaks comprises a first peak corresponding to ⅓ of the symbol duration, a second peak corresponding to ⅔, and a third peak corresponding to 3/3 of the symbol duration. In this example, the validation procedure 1020 may comprise a step 1021 of validating a first peak in each set of the plurality of peaks. Then, the validation procedure 1020 comprises a step 1022 of validating a second peak in each set of the plurality of sets of peaks. The validation procedure 1030 may further comprise a step of validating a third peak in each of the plurality of sets of peaks. In general, any number of peaks in the set of peaks may be validated. Some of the peaks in a set may not need to be validated, in which case only a subset of the peaks in a set are validated.

In general, validation of a peak includes determining whether or not the peak is a valid peak generated as a result of an auto-correlation which indicates a degree of correlation of the received signal with a combination of signal parameters or whether the peak was induced by another invalid source of correlation, for example by an echo, interference, or noise.

An example procedure for validating first, second, and third peaks in a set of validation peaks is set out below with reference to FIG. 11. The procedure for validating peaks comprises step 1121 at which each peak in each set of peaks is compared to a first pre-determined threshold to initially identify invalid peaks. Where the value of a peak does not meet or exceed the first pre-determined threshold, the peak is deemed to be invalid. An example of this comparison is illustrated in relation to FIG. 12(*a*) for each peak s a plurality of peaks S[s]. FIG. 12(*a*) illustrates an example in which fifteen peak values are generated prior to allocating the peaks to sets of peaks. The fifteen peaks are each compared with a first pre-determined threshold, $D_t$. If a peak does not meet or exceed $D_t$, the peak is identified as invalid (either before or after allocation to set(s)). As illustrated in FIG. 12(*a*), eight of the fifteen peaks are identified as invalid and the remaining seven peaks (illustrated with a hatched area in FIG. 12(*a*)) are candidates for valid peaks.

FIGS. 12(*b*) to (*d*) illustrated examples of three sets of peaks allocated according to the present disclosure. FIG. 12(*b*) illustrates an example first set of peaks comprising a first peak, a second peak, and a third peak. The first set of peaks is associated with the signal parameters 5 MHz and an FFT-size of 2K. The first peak can be seen at ⅓ of the symbol duration, the second peak can be seen at ⅔ of the symbol duration, and the third peak can be seen at 3/3 of the symbol duration. As illustrated in FIG. 12(*b*), the value of each of the first, second, and third peaks meets or exceeds $D_t$. None of the peaks of the first set of peaks have therefore been initially identified as invalid peaks.

FIG. 12(*c*) illustrates the peaks of a second set of peaks that also comprises a first peak, a second peak, and a third peak respectively associated with ⅓, ⅔, and 3/3 of the symbol duration for the signal parameters of 5 MHz and 4K. As can be seen in FIG. 12(*c*), the first peak of the second set of peaks meets or exceeds $D_t$ and thus the first peak is identified as a valid peak. In contrast, the values of the second and third peaks in FIG. 12(*c*) do not meet or exceed $D_t$ and thus are deemed to be invalid peaks.

FIG. 12(*d*) illustrates the peaks of a third set of peaks that also comprises a first peak, a second peak, and a third peak respectively associated with ⅓, ⅔, and 3/3 of the symbol duration for the signal parameters of 8 MHz and 8K. As illustrated in FIG. 12(*d*), the first peak of the third set of peaks does not meet or exceed $D_t$ and thus the first peak is not identified as an invalid peak. In contrast, the values of the second peaks and third peaks in FIG. 12(*d*) meet or exceed $D_t$ and thus are not deemed to be invalid peaks.

In general, each peak in each set of peaks is compared with $D_t$ and it is determined whether or not the value meets or exceeds $D_t$. If not, the peak is regarded as an invalid peak. If the peak does meet or exceed $D_t$, then the peak is a candidate for a valid peak. However, the remaining candidates for a valid peak undergo further validation before they can be considered to be valid peaks. Examples of further validation of the peaks are provided below.

FIG. 10(*b*) illustrates a step of validating first peaks 1021. This step may be implemented using step 1122 of the method of FIG. 11. In step 1122, the first peaks in each set of peaks may be validated by comparing a normalised rate of growth value (NRG value) for that peak with a second pre-determined threshold $D_2$. The NRG value is described in relation to FIG. 1 is an example of the NRG value that may be used in step 1122. The inventors have recognised that if a given peak has an NRG value less than the second pre-determined threshold, then the peak is likely not a valid peak. For example, in some arrangements where the OFDM signal is a DVB-T signal, $D_2$ may be set at 2.3. In some arrangements, it may be that the NRG value of a peak should be within a possible range of values if it is to be deemed a valid peak. For example, it may be that a further comparison is performed to determine whether the NRG value is greater than a further lower threshold before it is determined that the first peak is valid peak. Where the OFDM signal is a DVB-T signal, the lower threshold may be set at 3.0.

The NRG value used at step 1122 may be obtained in one of a number of different ways, and the approach described with reference to FIG. 1 is only an example. The NRG values may be obtained in other ways. The NRG values provide a measure of the rate at which the correlation peak values are increasing over time. Thus other rolling average calculations could be used.

Figure 11:
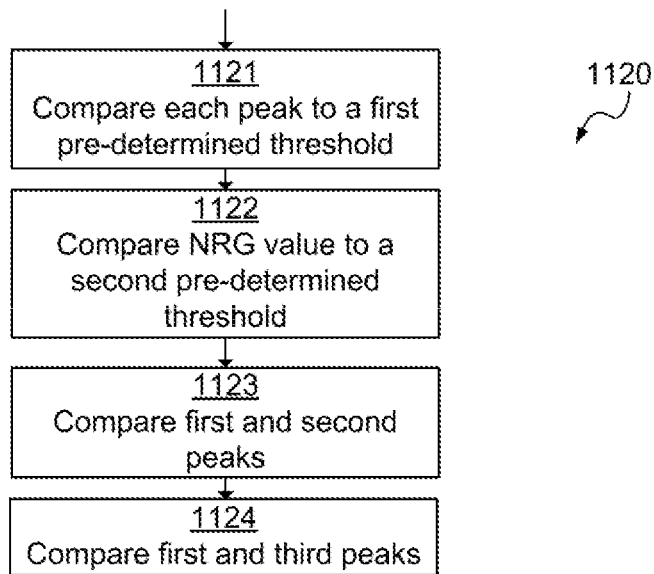
FIG. 11 illustrates an example procedure for validating first, second, and third peaks in a set of validation peaks according to the present disclosure.
Figure 12A:
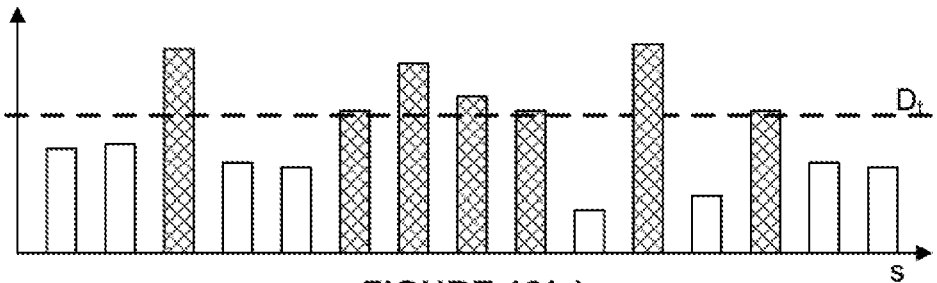
FIG. 12($a$) illustrates an example approach for invalidating peaks according to the present disclosure.
Figure 12B:
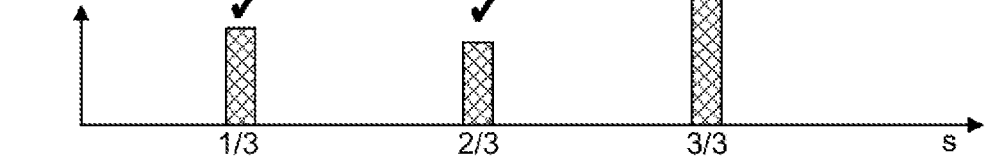
Figure 12C:
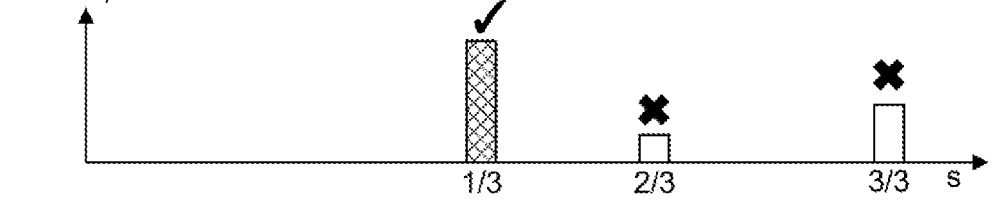
Figure 12D:
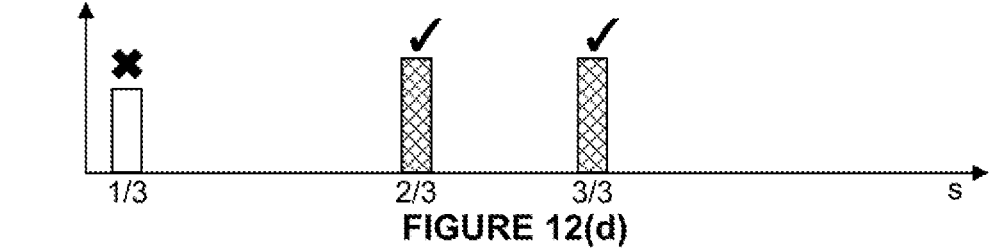

FIGS. 13(*a*) to (*e*) illustrate the validity status of peaks of the first, second, and last sets of peaks along the various steps of the example validation procedure of FIG. 11 applied to the example peaks of FIGS. 12(*a*) to 12(*d*). FIG. 13(*a*) illustrates the validation status of peaks as a result of invalidating peaks in accordance with FIG. 12(*a*) and step 1121 of FIG. 1120. Accordingly, the peaks marked with a tick in FIG. 13(*a*) are candidates for valid peaks whereas the peaks marked with a cross are invalid peaks. This means that on the first set of peaks, corresponding to combination (5 MHz; 2K), all three peaks are valid, while on the second set only the first peak is valid and on the last set only the second and third peaks are valid.

FIG. 13(*b*) illustrates the validation status of peaks in the first, second, and third sets of peaks after the first peaks have been validated in accordance with step 1122 of FIG. 11 and step 1022 of FIG. 10. In the example of FIG. 13(*b*), the first peak of the second set of peaks has been invalidated since the NRG value for that peak is not within the pre-determined thresholds, as described above. Accordingly, the first peak of the second set of peaks—namely the ⅓ peak for signal parameters 5 MHz and 4K—is invalidated. The remaining ⅓ peaks are retained as candidate valid peaks. As illustrated in FIG. 13(*b*) each of the peaks in the second set of peaks has been invalidated. Accordingly, the validation procedure does not need to take peaks of the second set of peaks into consideration anymore. Remaining FIGS. 13(*c*) to 13(*e*) therefore do not illustrate the second set of peaks.

The validation procedure illustrated in FIG. 10(*b*) proceeds to step 1022 at which the second peaks in each set of peaks is validated. An example process for validating the second peaks is illustrated in step 1123 of FIG. 11. In this step the values of each second peak are compared with the values of the corresponding first peak within the set of peaks.

The inventors have recognised that, in some examples, a second peak is an invalid peak if it has a higher peak value than the corresponding first peak in the same set of peaks. As an exception to this is if the peak value of the second peak is due to the presence of an echo, in which case it can be assumed that the second peak can be a candidate valid peak. To validate the second peaks in this example, the peak value of the first peak and second peak in a set of peaks is compared. In the event that the value of the first peak is greater than the value of the second peak, then the peak is deemed to be a candidate valid peak and the validation of the second peak is completed. If the second peak has a higher peak value than the corresponding first peak, then the second peak of that set may be an invalid peak. It is then determined whether or not the second peak is an echo peak. This may be done by receiving an external signal from an echo detector that indicates whether or not the second peak is an echo peak, which is a peak to which a portion of its peak value has been obtained due to the presence of an echo. If the second peak is an echo peak, it is then assumed that the second peak is a valid peak. This is because it is assumed that the large peak value of the second peak arose as a result of the echo and that there is a smaller peak value without the presence of the echo that would, otherwise, be valid. In this way, the second peak can be validated.

In the example of FIG. 12(*d*), it can be seen that for the third set of peaks, the first peak has a peak value that is smaller than the second peak. Accordingly, in FIG. 13(*d*) the second peak (⅔) is invalidated as indicated by the cross. For the first set of peaks, the second peak has a peak value smaller than the first peak and thus the second peak is a valid peak.

Having validated or invalidated the second peaks of each set of peaks, method 1020 proceeds to step 1023 at which the third peaks in each set of peaks is validated. An example method of validating third peaks in each set of peaks is illustrated in FIG. 11 at step 1124 at which the first and third peaks are considered. In this example, it is possible to determine whether the third peak is a valid peak by determining whether or not there is a valid first peak. If it has been determined that the third peak is a candidate for a valid peak and the first peak is a valid peak, then the inventors have recognised that the third peak can be considered to be a valid peak. In contrast, if the third peak of a particular set of peaks is a valid peak and the first peak in the set of peaks was invalidated, then the third peak is also invalidated. The inventors have recognised that the third peak is not present without the presence of a first peak. For example, the first peak may have been invalidated at step 1121 or 1122 of FIG. 11.

In the example of FIG. 13, it can be seen in FIG. 13(*d*) that, at the point at which step 1124 is performed, for the third set of peaks the first peak has been invalidated and the third peak is a candidate for a valid peak. Having performed step 1124, as described above, the third peak in the third set of peaks is invalidated. The result of completing step 1124 is illustrated in FIG. 13(*e*) in which each of the peaks of the third set of peaks is performed.

Having completed step 1124, the validation procedure is complete and a final determination as to the valid and invalid peaks in the sets of peaks is found. The method can therefore proceed to step 1030 at which it is determined, based on the determined valid and invalid peaks, which the values of the signal parameters of the received OFDM signal.

To determine the values of the combination of signal parameters, it is necessary to identify which set of peaks has the largest number of remaining valid peaks. One approach for determining the set of peaks with the largest number of remaining valid peaks is to count the number of peaks in each set and to maintain and update a value $M_p$ representing the highest number of valid peaks in a particular set of peaks. In the example of FIG. 13, the number of remaining peaks in the first set of peaks is three, in the second set of peaks is zero, and in the third set of peaks is zero. Accordingly, in that example $M_p$ is three.

The number of valid peaks for each set of signal parameters may be tracked in an array. Once all of the sets of peaks have been assessed, the set or sets of peaks having $M_p$ valid peaks are determined to be a candidate for the signal parameters. Where only a single set of peaks has $M_p$ valid peaks, the signal parameters associated with that set of peaks is determined to be the set of signal parameters. Where more than one set of peaks has $M_p$ valid peaks, the signal parameters associated with each set of peaks that has $M_p$ valid peaks is output. In this way, either a set of signal parameters or multiple candidate sets of signal parameters are output. Each set of signal parameters is therefore presented as a valid possible combination of signal parameters.

As discussed previously, it may also be that some of the peaks identified as valid peaks are echo peaks, meaning that an echo signal contributes to the peak value. In this way, the presence of echo peaks mean that it is unknown if a valid peak is present under the echo peak. If an echo peak were, aside from the contribution of an echo signal, a valid peak, then above-described counting of peaks would be valid. However, where an echo peak is disguising an invalid peak, it is necessary to identify this and to decrement the number of valid peaks determined for that set of peaks to reflect the actual number of valid peaks detected. Accordingly, as well as tracking the number of valid peaks for each set of peaks, the number of valid peaks that are not echo peaks may also be tracked for each set of peaks. Since an echo peak might mask a valid peak, present echo peaks may influence the determination of valid peaks, per combination of signal parameter values—which may also influence the value of $M_p$. In an example, when an echo peak is detected along with two other valid peaks in a given combination of signal parameter values, then that combination of peaks either has two or three valid peaks. If this combination happens to be the combination with the highest number of peaks and, hence, generates the value for $M_p$, then $M_p$ will be two. If other combinations have three peaks, then the combination with the echo peaks will be considered to also have three peaks.

Figure 14:
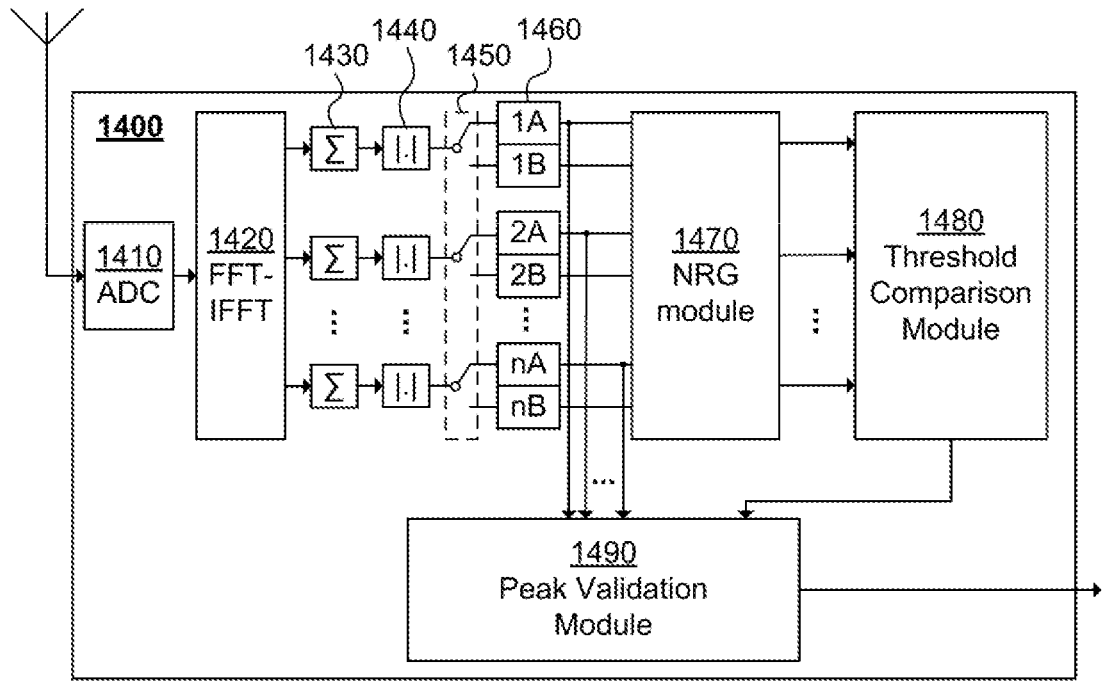
FIG. 14 illustrates an example OFDM signal detector and parameter estimator according to the present disclosure.

FIG. 14 illustrates an OFDM signal detector and parameter estimator 1400 according to an example of the present disclosure. OFDM signal detector and parameter estimator 1400 combines features from the OFDM signal detector of FIG. 5 and the OFDM signal parameter estimator of FIG. 9. OFDM signal detector and parameter estimator 1400 comprises an analogue-to-digital converter 1410, a correlation module 1420, a plurality of accumulation modules 1430, a plurality of absolute value modules 1440, a plurality of pairs of registers 1460, an NRG module 1470, a threshold comparison module 1480, and a peak validation module 1490.

The analogue-to-digital converter 1410 may be functionally the same element as analogue-to-converter 510 of FIG. 5 or analogue-to-converter 910 of FIG. 9. Correlation module 1420 may be functionally the same element as correlation module 520 of FIG. 5 and correlation module 920 of FIG. 9. Accumulation modules 1430 and absolute value modules 1440 may be the same elements as the corresponding modules 530 and 540 of FIG. 5 and modules 930 and 940 in FIG. 9. The plurality of pairs of registers 1460 may be the same elements as the pairs of registers 560 in FIG. 5. NRG module 1470 and threshold comparison module 1480 of FIG. 14 may be same elements as the NRG module 570 and threshold comparison module 580 of FIG. 5. The peak validation module 1490 of FIG. 14 may be same element as the peak validation module 960 of FIG. 9.

In the arrangement of FIG. 14, the OFDM signal detector and parameter estimator 1400 is configured to be able to use the NRG module 1470 and the threshold comparison module 1480 to make a determination as to the presence of an OFDM signal and/or the presence of an echo signal and to provide an indication of that determination to the peak validation module 1490 so as to control the peak validation module 1490. The NRG module 1470 may be able to determine which of the peaks are echo peaks by comparing the NRG value for each peak with an echo threshold, $D_e$. Any threshold that meets or exceeds echo threshold $D_e$ can be considered as an echo peak since the NRG value is influenced by the presence of an echo. If an NRG value associated with a peak does not meet or exceed the echo threshold, then the corresponding peak is not regarded as an echo peak. This determination may be made either in threshold comparison module 1480 or in peak validation module 1490.

Specifically, in one example the NRG module 1470 and the threshold comparison module 1480 is able to make a determination as to whether or not there is an OFDM signal present. This is described with reference to FIG. 5. Having made the determination as to whether or not an OFDM signal is present, it is possible for the threshold comparison module 1480 to pass a presence indication to the peak validation module 1490. If the determination is that there is no OFDM signal present, then the peak validation module 1490 is configured to disable its operation. Since there is no OFDM signal present, any signal parameters determined by the peak validation module would be erroneous. For this reason, the operation of the peak validation module 1490 is disabled, what also enables power saving.

Where the peak validation module 1490 is disabled due to a prior absence of an OFDM signal, the threshold comparison module 1480 may be configured to re-enable the peak validation module 1490. For example, where the threshold comparison module 1480 determines the subsequent presence of an OFDM signal, the threshold comparison module 1480 may be configured to transmit an indication to the peak validation module 1490 indicating the presence of an OFDM signal. In response to receiving the indication of the presence of an OFDM signal, the operation of the peak validation module 1490 may be re-enabled.

Furthermore, as previously described the threshold comparison module 1480 may be configured to identify the presence of echo peaks. Accordingly, the threshold comparison module 1480 may be configured to transmit to the peak validation module 1490 an indication as to which peaks are echo peaks. The peak validation module 1490 may therefore use this indication in determining which combination of signal parameters the OFDM signal has.

Figure 15:
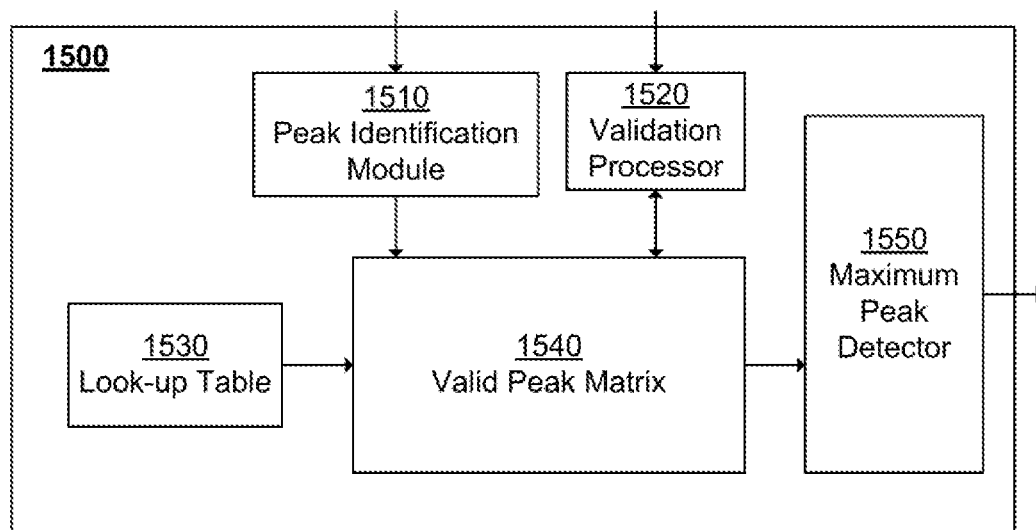
FIG. 15 illustrates an example peak validation module according to the present disclosure.

FIG. 15 illustrates an example peak validation module 1500 configured to identify the combination of signal parameters of an OFDM signal. Peak validation module 1500 may be implemented, for example, as the peak validation module 1490 in the OFDM signal detector and parameter estimator 1400 of FIG. 14 or the peak validation module 960 in the OFDM parameter estimator 900 of FIG. 9. Peak validation module 1500 comprises a peak identification module 1510, a validation processor, a look-up table 1530, a valid peak matrix 1540, and a maximum peak detector 1550.

Peak identification module is configured to receive the peak values for a number of peak values from registers and to determine whether or not each peak meets or exceeds a first pre-determined threshold. This determination is made, for example, in accordance with step 1121 of FIG. 11. In this way, a number of peaks are discounted from further consideration because their peak values are too small for further consideration.

Remaining candidate peaks are passed from the peak identification module 1510 to the valid peak matrix 1540 in which the peaks are stored in the matrix in sets of peaks, where each set of peaks is associated with a respective combination of signal parameters. The valid peak matrix 1540 stores the peaks in sets as illustrated, for example, in FIG. 13. The sets of peaks are determined based upon values stored in look-up table 1530. Look-up table 1530 is configured to store an association between specific lags and their position with respective sets of peaks. An example look-up table is illustrated below:

| Combination of signal parameters | 1/3 | 2/3 | 3/3 | G |
|---|---|---|---|---|
| 5 MHz, 2K, 1/32 | 4 | 11 | 24 | 25 |
| ... | | | | |
| 7 MHz, 4K, 1/32 | 6 | 23 | 35 | 36 |
| ... | | | | |
| 8 MHz, 2K, 1/4 | 18 | 40 | 52 | 60 |

As can be seen in them look-up table, three example sets of peaks are illustrated. For each peak, a specific lag is associated with each of the first to fourth peaks. The valid peak matrix 1540 is able to determine, based on the specific lag of a peak, which peaks in which sets of peaks the peak value should be placed. For example, the peak with lag 40 should be placed as the second peak in the set of peaks corresponding with the combination of signal parameters 8 MHz, 2K, ¼. Similarly, a received peak with a lag 24 should be allocated to their peak of the set of peaks corresponding with the combination of signal parameters 5 MHz, 2K, ⅓₂. As discussed previously, each specific lag may be associated with more than one peak across the sets of peaks. In this way, it is possible to populate more than one peak in the peak matrix from a single received peak. After population of the valid peak matrix is completed based on the received peaks, the remaining locations in the peak matrix that have not populated are deemed to be invalid peaks and are thus marked as invalid.

Having established sets of peaks in the valid peak matrix 1540, the validation processor 1520 is configured to perform the validation procedure to validate or invalidate peaks. The validation processor 1520 may perform a validation procedure in accordance with step 1020 of FIG. 10(*a*) and/or 10(*b*) and/or FIG. 11. The validation processor 1520 may be configured to receive one or more of an echo signal indication that indicates which peaks are echo peaks and an OFDM signal presence indication. The echo signal indication can be used as part of the validation procedure as previously described. The OFDM signal presence indication can be used to disable the validation processor 1520 to prevent operation of the validation processor. The OFDM signal presence indication can also be used to disable one or more of the other elements of peak validation module 1490. Once the validation processor has been completed, the remaining valid peaks are counted in each set of peaks using maximum peak detector 1550.

The maximum number of peaks is determined and the sets having the maximum number of peaks are determined. One or more combinations of signal parameters that correspond with the sets of peaks having the maximum number of valid peaks is determined and output.

Methods described herein can be implemented in any appropriate receiver or can be implemented separately to a receiver. The methods can be implemented partially in a receiver and partially in other devices or modules. The methods and receivers described herein can be applied to any OFDM signal. The OFDM signal may be a DVB signal, such as a DVB-T signal or a DVB-T2 signal. The OFDM signal may an IEEE 802.11 signal, such as an 802.11a signal, an 802.11g signal, an 802.11n signal, and/or an 802.11ac signal. The OFDM signal may be a WiMAX signal, an LTE signal, or may be any other signal that was encoded using OFDM. The OFDM receiver may be a receiver for receiving the specific type of OFDM signal. For example, where the OFDM signal is a DVB signal, the OFDM receiver may be a DVB receiver.

Figure 16:
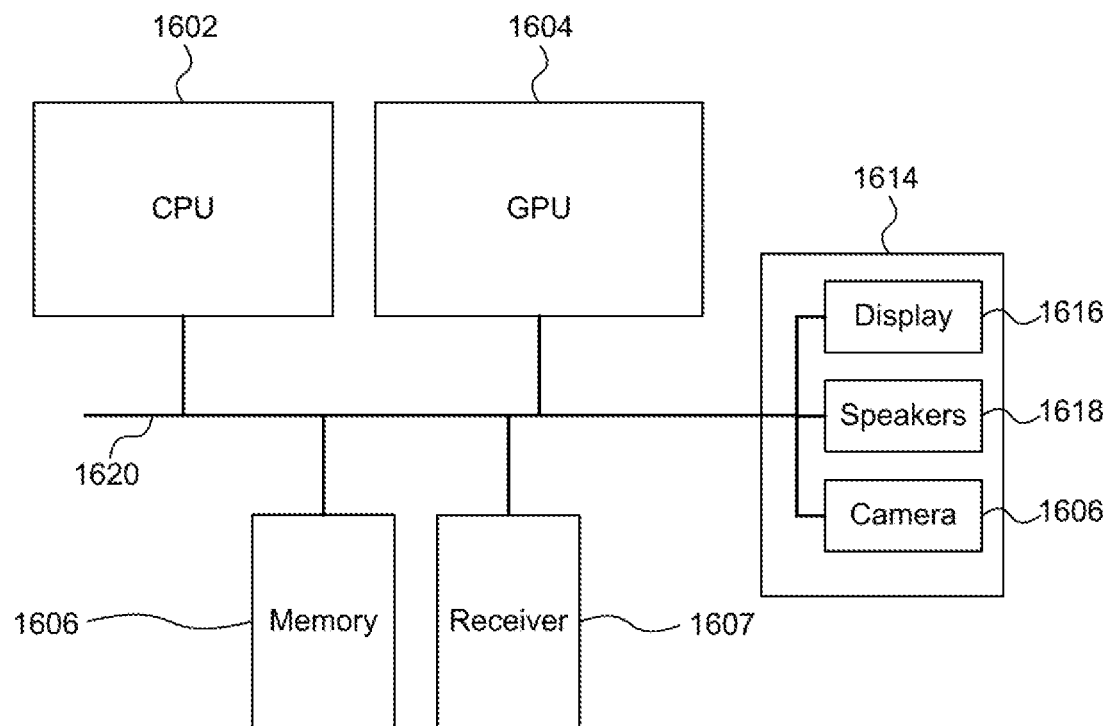
FIG. 16 illustrates a computer system in which methods and/or receivers of the present disclosure may be implemented.

As set out herein, there is described OFDM signal detectors, OFDM signal parameter estimators, and OFDM signal detector and parameter estimators, as well as OFDM receivers that can include any of the above detectors/estimators. FIG. 16 shows a computer system in which any of the OFDM receivers, signal detectors, OFDM signal parameter estimators, and OFDM signal detector and parameter estimators described herein may be implemented. The computer system comprises one or more of a CPU 1602, a GPU 1604, a receiver 1607 (which include one or more of signal detector 500, OFDM parameter estimator 900, or OFDM signal detector and parameter estimator 1400), a memory 1606 and other devices 1614, such as a display 1616, speakers 1618 and a camera 1606. Methods described herein, for example, may be partially or wholly implemented in one or more of the receiver 1607, the GPU 1604, and/or the CPU 1604. The components of the computer system can communicate with each other via a communications bus 1620.

The signal detector of FIG. 5, OFDM parameter estimator of FIG. 9, and OFDM signal detector and parameter estimator of FIG. 14 are shown as comprising a number of functional blocks. This is schematic only and is not intended to define a strict division between different logic elements of such entities. Each functional block may be provided in any suitable manner. It is to be understood that intermediate values described herein as being formed by these elements need not be physically generated by these elements at any point and may merely represent logical values which conveniently describe the processing performed by these elements between its input and output.

The OFDM signal detectors, OFDM signal parameter estimators, and OFDM signal detector and parameter estimators, as well as OFDM receivers that can include any of the above detectors/estimators described herein may be embodied in hardware on an integrated circuit. The OFDM signal detectors, OFDM signal parameter estimators, and OFDM signal detector and parameter estimators, as well as OFDM receivers that can include any of the above detectors/estimators described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture an OFDM receiver or a signal detector configured to perform any of the methods described herein, or to manufacture an OFDM receiver or a signal detector comprising any apparatus described herein. An integrated circuit definition dataset may be, for example, an integrated circuit description.

Therefore, there may be provided a method of manufacturing, at an integrated circuit manufacturing system, an OFDM receiver or a signal detector as described herein. Furthermore, there may be provided an integrated circuit definition dataset that, when processed in an integrated circuit manufacturing system, causes the method of manufacturing an OFDM receiver or a signal detector to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an OFDM signal detector, an OFDM signal parameter estimator, and/or an OFDM signal detector and parameter estimator, as well as an OFDM receiver that can include one or more of the above detectors/estimators will now be described with respect to FIG. 17.

Figure 17:
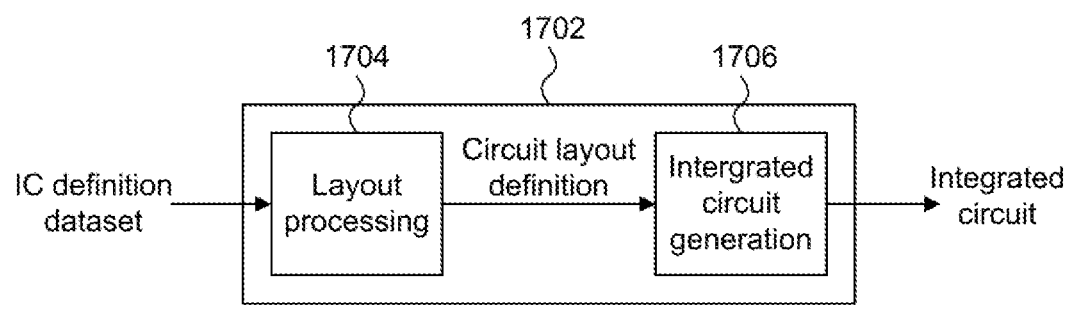
FIG. 17 shows an integrated circuit manufacturing system for generating an integrated circuit embodying an OFDM signal detector, an OFDM signal parameter estimator, and/or an OFDM signal detector and parameter estimator, as well as an OFDM receiver that can include one or more of the above detectors/estimators of the present disclosure.

FIG. 17 shows an example of an integrated circuit (IC) manufacturing system 1702 which is configured to manufacture an OFDM signal detector, an OFDM signal parameter estimator, and/or an OFDM signal detector and parameter estimator, as well as an OFDM receiver that can include one or more of the above detectors/estimators as described in any of the examples herein. In particular, the IC manufacturing system 1702 comprises a layout processing system 1704 and an integrated circuit generation system 1706. The IC manufacturing system 1702 is configured to receive an IC definition dataset (e.g. defining an OFDM signal detector, an OFDM signal parameter estimator, and/or an OFDM signal detector and parameter estimator, as well as an OFDM receiver that can include one or more of the above detectors/estimators as described in any of the examples herein), process the IC definition dataset, and generate an IC according to the IC definition dataset (e.g. which embodies an OFDM signal detector, an OFDM signal parameter estimator, and/or an OFDM signal detector and parameter estimator, as well as an OFDM receiver that can include one or more of the above detectors/estimators as described in any of the examples herein). The processing of the IC definition dataset configures the IC manufacturing system 1702 to manufacture an integrated circuit embodying an OFDM signal detector, an OFDM signal parameter estimator, and/or an OFDM signal detector and parameter estimator, as well as an OFDM receiver that can include one or more of the above detectors/estimators as described in any of the examples herein.

The layout processing system 1704 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1704 has determined the circuit layout it may output a circuit layout definition to the IC generation system 1706. A circuit layout definition may be, for example, a circuit layout description.

The IC generation system 1706 generates an IC according to the circuit layout definition, as is known in the art. For example, the IC generation system 1706 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1706 may be in the form of computer-readable code which the IC generation system 1706 can use to form a suitable mask for use in generating an IC.

The different processes performed by the IC manufacturing system 1702 may be implemented all in one location, e.g. by one party. Alternatively, the IC manufacturing system 1702 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an OFDM signal detector, an OFDM signal parameter estimator, and/or an OFDM signal detector and parameter estimator, as well as an OFDM receiver that can include one or more of the above detectors/estimators without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 10 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 10, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a pre-defined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of determining a combination of signal parameters of a received OFDM signal, the method comprising:
 determining, for each of a plurality of lags, a plurality of correlation peaks for the OFDM signal, wherein the correlation peaks form a plurality of sets of peaks, wherein each set of peaks is associated with a combination of signal parameters of the OFDM signal;
 performing a validation procedure to validate one or more peaks in the plurality of sets of peaks based on at least one correlation peak value; and determining the combination of signal parameters of the OFDM signal based on a plurality of validated peaks in a set of peaks.

2. The method according to claim 1, wherein each peak of a set of peaks corresponds with a pre-determined lag-of-interest for that combination of signal parameters.

3. The method according to claim 1, wherein determining the combination of signal parameters comprises identifying a combination of signal parameters associated with a set of peaks having an identified maximum number of valid peaks in a set of peaks.

4. The method according to claim 3, further comprising counting the number of valid peaks in each set of peaks and maintaining an identified maximum number of valid peaks in a set of peaks and identifying one or more sets of peaks that have a number of valid peaks that matches the identified maximum number of valid peaks in a set of peaks.

5. The method according to claim 1, further comprising comparing the value of each peak to a first pre-determined threshold and invalidating any peak if the value of that peak does not meet or exceed the first pre-determined threshold.

6. The method according to claim 1, wherein each set of peaks comprises a first peak and a second peak, and the method further comprises validating first peaks using a first peak validation step and validating second peaks using a second peak validation step different from the first peak validation step.

7. The method according to claim 6, wherein the first peak validation comprises comparing a normalised rate of growth value to a second pre-determined threshold.

8. The method according to claim 6, wherein the second peak validation comprises comparing the peak value of the first peak with the peak value of the second peak within a set of peaks.

9. The method according to claim 8, wherein:
the second peak is invalidated if the peak value of the second peak exceeds the peak value of the first peak within a set of peaks; and
the second peak is determined to be a valid peak if the peak value exceeds the peak value of the first peak within a set of peaks and the second peak is deemed to be an echo peak.

10. The method according to claim 6, wherein each set of peaks comprises a third peak and wherein the method further comprises validating third peaks by comparing the peak value of the first peak to the peak value of the third peak within the set of peaks.

11. The method according to claim 1, further comprising a presence indication that indicates the presence or absence of the received OFDM signal and selectively disabling operation based on the presence indication.

12. The method according to claim 1, further comprising determining one or more peaks as echo peaks and performing the validation procedure based on the determined echo peaks.

13. The method according to claim 1, further comprising calculating, for a block of samples of the received input signal, an auto-correlation value at each of a plurality of lags-of-interest by determining the inverse Fourier transform of the absolute value of the Fourier transform of the block of samples of the input signal.

14. The method according to claim 6, wherein the first peak in each set of peaks is determined at a lag corresponding to one third of the OFDM symbol duration for that combination of signal parameters and wherein the second peak in each set of peaks is determined at a lag corresponding to two thirds of the OFDM symbol duration for that combination of signal parameters.

15. The method according to claim 1, wherein the method is implemented in an OFDM receiver or OFDM signal parameter estimator.

16. An OFDM signal parameter estimator configured to determine a combination of signal parameters of a received OFDM signal, the estimator configured to:
determine, for each of a plurality of lags, a plurality of correlation peaks for the OFDM signal, wherein the correlation peaks form a plurality of sets of peaks, wherein each set of peaks is associated with a combination of signal parameters of the OFDM signal;
perform, using a peak validation module, a validation procedure to validate one or more peaks in the plurality of sets of peaks based on at least one correlation peak value; and
determine the combination of signal parameters of the OFDM signal based on a plurality of validated peaks in a set of peaks.

17. The OFDM signal parameter estimator according to claim 16, wherein the OFDM signal parameter estimator is configured to determine the combination of signal parameters by:
identifying a combination of signal parameters associated with a set of peaks having an identified maximum number of valid peaks in a set of peaks;
counting the number of valid peaks in each set of peaks;
maintaining an identified maximum number of valid peaks in a set of peaks; and
identifying one or more sets of peaks that have a number of valid peaks that matches the identified maximum number of valid peaks in a set of peaks.

18. The OFDM signal parameter estimator according to claim 16, wherein each set of peaks comprises a first peak and a second peak, and the OFDM signal parameter estimator is configured to validate first peaks using a first peak validation step and validate second peaks using a second peak validation step different from the first peak validation step, wherein:
the OFDM signal parameter estimator is configured to validate first peaks by comparing a normalised rate of growth value to a second pre-determined threshold; and
the OFDM signal parameter estimator is configured to validate second peaks by comparing the peak value of the first peak with the peak value of the second peak within a set of peaks.

19. The OFDM signal parameter estimator according to claim 18, wherein:
the second peak is invalidated if the peak value of the second peak exceeds the peak value of the first peak within a set of peaks; and
the second peak is determined to be a valid peak if the peak value exceeds the peak value of the first peak within a set of peaks and the second peak is deemed to be an echo peak.

20. A computer readable storage medium having stored thereon a computer readable description of an integrated circuit that, when processed in an integrated circuit manufacturing system, causes the integrated circuit manufacturing system to manufacture an OFDM signal parameter estimator embodied in hardware on an integrated circuit as claimed in claim 16.

* * * * *